US012689912B2

(12) United States Patent
Palayur et al.

(10) Patent No.: US 12,689,912 B2
(45) Date of Patent: Jul. 21, 2026

(54) ACCESS POINT (AP) ANGLE OF ARRIVAL (AOA) INTERFERENCE REDUCTION

(71) Applicant: MAXLINEAR, INC., Carlsbad, CA (US)

(72) Inventors: Saju Palayur, Poway, CA (US); Salvador Iranzo Molinero, Bétera (ES)

(73) Assignee: MaxLinear, Inc., Carlsbad, CA (US)

( * ) Notice: Subject to any disclaimer, the term of this patent is extended or adjusted under 35 U.S.C. 154(b) by 203 days.

(21) Appl. No.: 18/355,374

(22) Filed: Jul. 19, 2023

(65) Prior Publication Data

US 2025/0031060 A1     Jan. 23, 2025

(51) Int. Cl.
*H04W 16/28* (2009.01)

(52) U.S. Cl.
CPC ................................... *H04W 16/28* (2013.01)

(58) Field of Classification Search
CPC ... H04W 16/28; H04W 16/14; H04W 72/046; H04W 72/541; H04W 52/243; H04W 72/543; H04B 7/0617; H04B 7/06952; H04B 7/088; H04L 1/0026
See application file for complete search history.

(56) References Cited

U.S. PATENT DOCUMENTS

| | | | | |
|---|---|---|---|---|
| 7,593,729 B2 * | 9/2009 | Barak | ................... | H04L 1/0026 |
| | | | | 725/62 |
| 9,491,770 B1 * | 11/2016 | Heninwolf | .......... | H04W 72/541 |
| 9,801,188 B2 * | 10/2017 | Khandekar | ......... | H04W 72/541 |

| | | | | |
|---|---|---|---|---|
| 2004/0114535 A1 * | 6/2004 | Hoffmann | .............. | H04B 7/088 |
| | | | | 455/562.1 |
| 2006/0209876 A1 * | 9/2006 | Liu | .................... | H04B 7/06952 |
| | | | | 370/352 |
| 2012/0314663 A1 | 12/2012 | Dwivedi et al. | | |
| 2015/0065157 A1 | 3/2015 | Homchaudhuri et al. | | |

(Continued)

FOREIGN PATENT DOCUMENTS

| | | |
|---|---|---|
| EP | 3806525 A2 | 4/2021 |
| WO | 2022000368 A1 | 1/2022 |
| WO | 2023239971 A1 | 12/2023 |

OTHER PUBLICATIONS

Federal Communications Commission: "FCC Requests 6 GHz Automated Frequency Coordination Proposals," Federal Register, Oct. 21, 2021, vol. 86, No. 201, pp. 58267-58269, Entire Document [Retrieved on Aug. 7, 2023] Retrieved from URL: https://www.govinfo.gov/content/pkg/FR-2021-10-21/pdf/2021-22765.pdf.

(Continued)

*Primary Examiner* — Bernarr E Gregory
(74) *Attorney, Agent, or Firm* — Buchalter; Jason W. Croft

(57) ABSTRACT

According to an aspect of an example, an access point (AP) may include a processing device and a transceiver. The processing device may be configured to detect an incumbent transmission from an incumbent device. The processing device may be configured to compute an angle of arrival between the AP and the incumbent transmission from the incumbent device. The processing device may be configured to generate an incumbent avoidance beam, wherein the incumbent avoidance beam is configured to transmit in one or more operating directions to facilitate avoidance of the incumbent device. The transceiver may be configured to transmit the incumbent avoidance beam.

20 Claims, 15 Drawing Sheets

(56) References Cited

U.S. PATENT DOCUMENTS

| | | | |
|---|---|---|---|
| 2016/0165619 A1* | 6/2016 | McMilin ............. | H04W 72/543 |
| | | | 370/329 |
| 2018/0063794 A1* | 3/2018 | Sanderovich ....... | H04W 52/243 |
| 2018/0145721 A1 | 5/2018 | Negus et al. | |
| 2018/0146488 A1 | 5/2018 | Li et al. | |
| 2019/0342795 A1 | 11/2019 | McFarland et al. | |
| 2020/0367020 A1 | 11/2020 | Ansley et al. | |
| 2020/0413491 A1 | 12/2020 | Ansley et al. | |
| 2021/0058856 A1 | 2/2021 | Qi et al. | |
| 2021/0281295 A1 | 9/2021 | Li et al. | |
| 2021/0368362 A1 | 11/2021 | Rengarajan et al. | |
| 2023/0147636 A1 | 5/2023 | Kim et al. | |
| 2023/0232242 A1 | 7/2023 | Palayur et al. | |
| 2023/0403690 A1 | 12/2023 | Palayur et al. | |

OTHER PUBLICATIONS

International Search Report and Written Opinion for International Application No. PCT/US2023/025089, mailed Sep. 7, 2023, 15 Pages.
Wi-Fi Alliance. 'AFC System (SUT) Compliance Test Plan' version 1.4.2 [retrieved May 23, 2023]. Retrieved from the Internet <URL: https://www.wi-fi.org/downloads-registered-guest/AFC_Specfications_and_Test_Plans_05082023.zip/38132>.
FC news from the Federal Communications Commission FCC Adopts New Rules for the 6 GHz Band, Unleashing 1,200 Megahertz of Spectrum for Unlicensed Use. Apr. 23, 2020.
Wi-Fi Alliance. 'Wi-Fi 6E: Wi-Fi® in the 6 GHz band.' Jan. 2021.
Wi-Fi Alliance. 'Wi-Fi 6E Insights.' Issue 1, Apr. 2021.
Wi-Fi Alliance. 'Wi-Fi 6E Insights.' Issue 2, Jul. 2021.
Wi-Fi Alliance. 'Wi-Fi 6E Insights.' Issue 3, Oct. 2021.
Wi-Fi Alliance. 'Wi-Fi 6E Insights.' Issue 4, 2021.
Wi-Fi Alliance. 'Wi-Fi 6E Insights.' Issue 5, Apr. 2022.
Wi-Fi Alliance. 'Wi-Fi 6E Insights.' Issue 6, Jul. 2022.
Wi-Fi Alliance. 'Wi-Fi 6E Insights.' Issue 7, Nov. 2022.
Wi-Fi Alliance. 'Wi-Fi 6E Insights.' Issue 8.
Federal Communications Commission "Report and Order and Further Notice of Proposed Rulemaking" FCC 20-51. Apr. 24, 2020.
Wi-Fi Alliance. 'Automated Frequency Coordination (AFC).' [retrieved May 23, 2023]. Retrieved from the Internet <URL: https://www.wi-fi.org/downloads-registered-guest/AFC_Specfications_and_Test_Plans_05082023.zip/38132>.
Wi-Fi Alliance. 'AFC System Reference Model' version 1.0 [retrieved May 23, 2023]. Retrieved from the Internet <URL: https://www.wi-fi.org/downloads-registered-guest/AFC_Specfications_and_Test_Plans_05082023.zip/38132>.
Wi-Fi Alliance. 'AFC System to AFC Device Interface Specification' version 1.4.1 [retrieved May 23, 2023]. Retrieved from the Internet <URL: https://www.wi-fi.org/downloads-registered-guest/AFC_Specfications_and_Test_Plans_05082023.zip/38132>.
Wi-Fi Alliance. 'AFC Device (DUT) Compliance Test Plan' version 1.3.3 [retrieved May 23, 2023]. Retrieved from the Internet <URL: https://www.wi-fi.org/downloads-registered-guest/AFC_Specfications_and_Test_Plans_05082023.zip/38132>.
Dynamic Frequency Selection. Wikipedia. [online]. [retrieved on Jun. 12, 2023]. Retrieved from the Internet: <URL: <https://en.wikipedia.org/wiki/Dynamic_frequency_selection.
'Wi-Fi 6 OFDMA—How Does it Work and How Do You Test?' LitePoint. [online]. [retrieved on Jun. 12, 2023]. Retrieved from the Internet: <https://www.litepoint.com/blog/wi-fi-6-ofdma/>.
'WLAN PPDU Structure.' MathWorks. [online]. [retrieved on Jun. 12, 2023]. Retrieved from the Internet: <https://www.mathworks.com/help/wlan/gs/wlan-ppdu-structure.html>.
'Backhaul (telecommunications).' Wikipedia. [online]. [retrieved on Jun. 12, 2023]. Retrieved from the Internet: <https://en.wikipedia.org/wiki/Backhaul_(telecommunications)>.
IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Amendment 1: Enhancements for High-Efficiency WLAN, Sections 27.3.20.6 CCA sensitivity, pp. 644 to 657;Sections 27.3.21 HE transmit procedure, p. 647 to 651; Section 27.3.22 HE receive procedure, p. 652-658. Retrieved from the Internet May 23, 2023< URL: https://standards.ieee.org/.
International Telecommunication Union (ITU), Radiocommunication Sector of ITU (ITU-R), Recommendation ITU-R F.383-10 (Feb. 2021), "Radio-frequency channel arrangements for high-capacity fixed wireless systems operating in the lower 6 GHz (5 925 to 6 425 MHz) band." [online], [retrieved on Jun. 12, 2023]. Retrieved from the Internet < URL: https://www.itu.int/rec/R-REC-F.383/_page.print>.
International Telecommunication Union (ITU), Radiocommunication Sector of ITU (ITU-R), Recommendation ITU-R F.384-11 (Mar. 2012), "Radio-frequency channel arrangements for medium- and high-capacity digital fixed wireless systems operating in the 6 425-7 125 MHz band." [online], [retrieved on Jun. 12, 2023]. Retrieved from the Internet <URL: https://www.itu.int/rec/R-REC-F.384/_page.print>.
Wikipedia, Antenna diversity [retrieved on Jul. 19, 2023]. Retrieved from the Internet <https://en.wikipedia.org/wiki/Antenna_diversity>.
Wikipedia, Diversity scheme [retrieved on Jul. 19, 2023]. Retrieved from the Internet <https://en.wikipedia.org/wiki/Diversity_scheme>.
Non-Final Office Action for U.S. Appl. No. 18/064,191, dated Jul. 16, 2025, 38 pages.

* cited by examiner

100

102

104

Preamble Symbols

ACMB Symbols

Payload Symbols

Dummy Symbols

Pilot Symbols

600

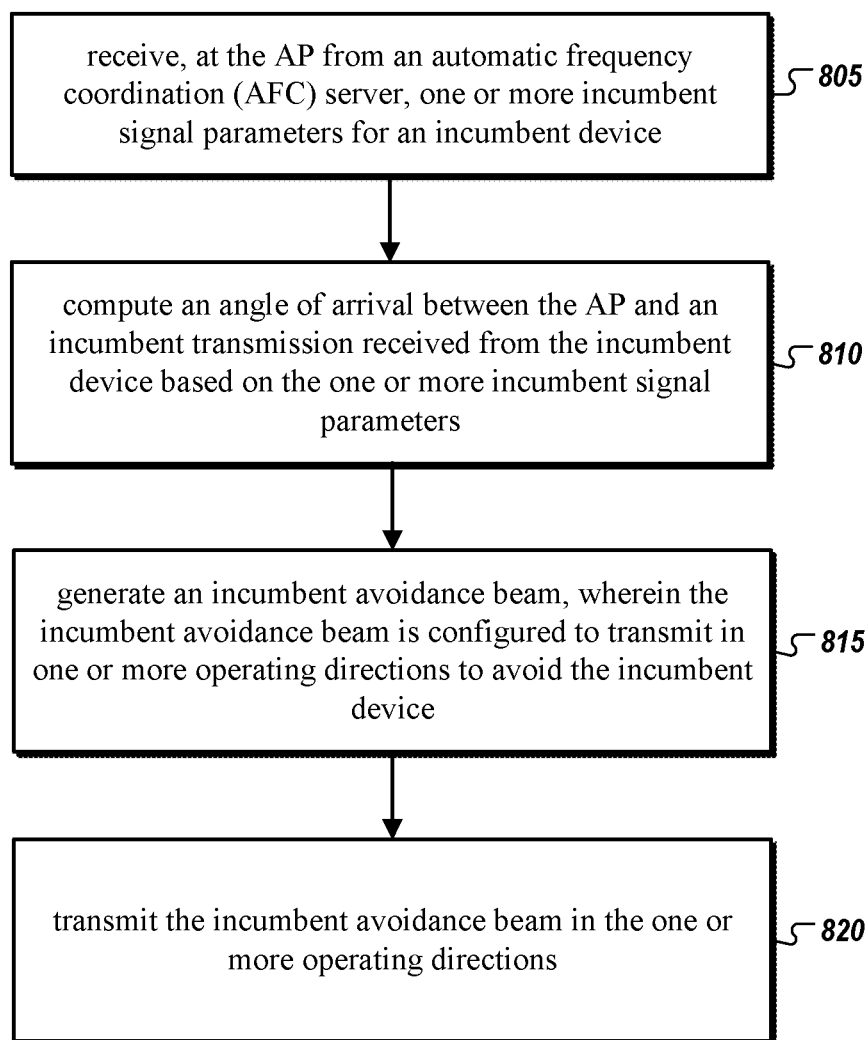

800 receive, at the AP from an automatic frequency coordination (AFC) server, one or more incumbent signal parameters for an incumbent device ⎯ 805 compute an angle of arrival between the AP and an incumbent transmission received from the incumbent device based on the one or more incumbent signal parameters ⎯ 810 generate an incumbent avoidance beam, wherein the incumbent avoidance beam is configured to transmit in one or more operating directions to avoid the incumbent device ⎯ 815 transmit the incumbent avoidance beam in the one or more operating directions ⎯ 820

FIG. 8

ACCESS POINT (AP) ANGLE OF ARRIVAL (AOA) INTERFERENCE REDUCTION

FIELD

The examples discussed in the present disclosure are related to access point (AP) angle of arrival (AoA) interference reduction, and in particular, to AP inference reduction to incumbent devices and related receivers.

BACKGROUND

Unless otherwise indicated herein, the materials described herein are not prior art to the claims in the present application and are not admitted to be prior art by inclusion in this section.

Wi-Fi® communications may be configured to occur in multiple frequency bands, including the 2.4 GHZ, 5 GHZ, and 6 GHz frequency bands. Additionally, some Wi-Fi® communications may be broadcast over different radio links that may include varying operating frequencies. Some incumbent communication systems may also be configured to communicate using the same or similar frequencies as Wi-Fi® communications. In some circumstances, interference between the Wi-Fi® communications and the incumbent communications may occur.

The subject matter claimed in the present disclosure is not limited to examples that solve any disadvantages or that operate only in environments such as those described above. Rather, this background is only provided to illustrate one example technology area where some examples described in the present disclosure may be practiced.

SUMMARY

An access point (AP) may include a processing device and a transceiver. The processing device may be configured to: detect one or more incumbent transmissions from an incumbent device; compute an angle of arrival between the AP and the one or more incumbent transmissions received from the incumbent device; and generate an incumbent avoidance beam, wherein the incumbent avoidance beam is configured to transmit in one or more operating directions to facilitate avoidance of the incumbent device. The transceiver may be configured to transmit the incumbent avoidance beam in the one or more operating directions.

An access point (AP) may include a processing device and a transceiver. The processing device may be configured to receive, at the AP from an automatic frequency coordination (AFC) server, one or more incumbent signal parameters for an incumbent device. The processing device may be configured to compute an angle of arrival between the AP and the incumbent device based on the one or more incumbent signal parameters. The processing device may be configured to generate an incumbent avoidance beam, wherein the incumbent avoidance beam is configured to transmit in one or more operating directions to avoid interference at an incumbent receiver from the incumbent device. The transceiver may be configured to transmit the incumbent avoidance beam.

An access point (AP) may include a transceiver configured to receive a backhaul transmission from a backhaul device and a processing device. The processing device may be configured to detect the backhaul transmission from the backhaul device. The processing device may be configured to compute an angle of arrival between the AP and the backhaul transmission received from the backhaul device.

The backhaul transmission may be detected using one or more of: a signaling aid in the backhaul transmission, or an AP preamble in the backhaul transmission, or a correlation between the backhaul transmission and one or more of a backhaul preamble or a backhaul pilot.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 8 illustrates an example process flow of an access point configured to generate an incumbent avoidance beam using an automated frequency coordination (AFC) system.

DESCRIPTION OF EMBODIMENTS

Figure 1:
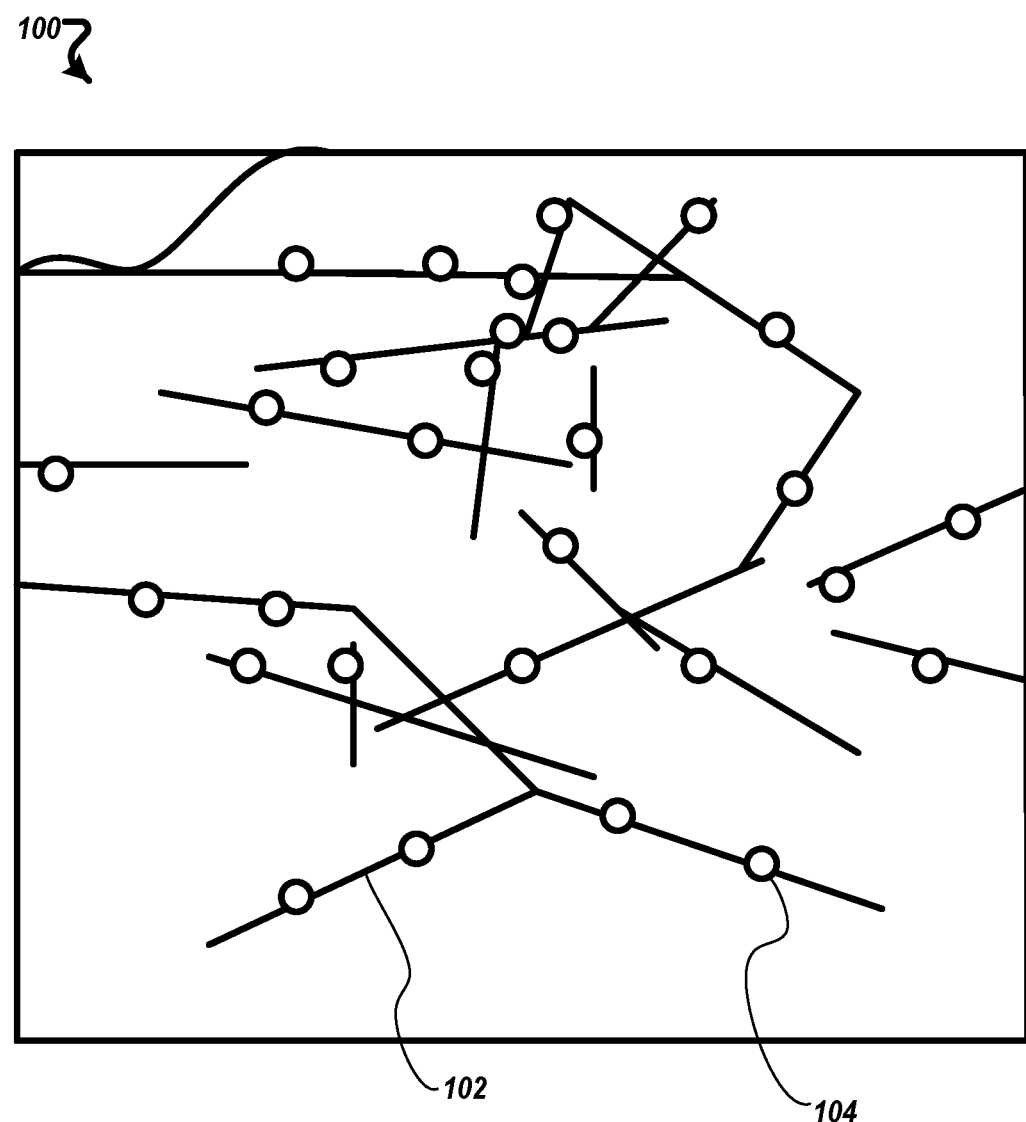
FIG. 1 illustrates an example diagram showing service paths in an example service area.

In association with 6 gigahertz (GHz) Wi-Fi® communications, the Federal Communications Commission (FCC) has set forth predicted interference-to-noise (I/N) ratios for 6 GHz receivers (e.g., incumbent systems) that may not exceed −6 dB. In some circumstances, an access point (AP) seeking deployment may demonstrate communications in the 6 GHz frequency band do not exceed −6 dB I/N through lab testing and/or field testing. In some circumstances, the FCC may withhold communication authorization for an AP that has not demonstrated an acceptable I/N ratio.

To avoid interference with incumbents (e.g., fixed service, satellite service, TV and broadcast services), an AP seeking deployment may use a power transmission mode that is less than a predefined threshold when communicating in a frequency channel that may interfere. For example, a low power indoor transmit power mode may be used to avoid interference because the power threshold may not be adequately high to pass through walls to interfere with backhaul modems or other incumbent transmission.

An access point may be configured to measure interference and avoid generating interference but may not have sufficient information to avoid interference to incumbent devices and backhaul devices. For example, without adequate location information about the access point, the incumbent device, or the backhaul device, the access point may not be able to avoid interfering with the incumbent devices and backhaul devices. Even without specific location information, an access point may detect the angle of arrival of various signals received from incumbent devices and backhaul devices. Measuring the angle of arrival between the access point and one or more of the incumbent devices and/or the backhaul devices (which may be computed at the access point with or without receiving information from a database or without specific location information about the access point, incumbent devices, or backhaul devices) may allow the access point to avoid interfering with these other devices by avoiding transmission in selected directions.

Computing the angle of arrival allows for standard power without using an automated frequency coordination server or without having location information (e.g., from a global positioning service).

Computing the angle of arrival may be used in conjunction with an automated frequency server and/or location information to provide an enhanced technique for avoiding interference between an access point and incumbent devices and/or backhaul devices. Computing the angle of arrival may be used in conjunction with different techniques for detecting a transmission (e.g., detecting a backhaul transmission using a signaling aid, correlating backhaul preamble and/or pilot sequences, inserting a Wi-Fi preamble in a backhaul modem frame, or the like).

An access point (AP), including a processing device and a transceiver. The processing device may be configured to: detect one or more incumbent transmissions from an incumbent device; compute an angle of arrival between the AP and the one or more incumbent transmissions received from the incumbent device; and generate an incumbent avoidance beam, wherein the incumbent avoidance beam is configured to transmit in one or more operating directions to facilitate avoidance of the incumbent device. The transceiver may be configured to transmit the incumbent avoidance beam in the one or more operating directions.

An access point (AP) may include a processing device and a transceiver. The processing device may be configured to: receive, at the AP from an automatic frequency coordination (AFC) server, one or more incumbent signal parameters for an incumbent device; compute an angle of arrival between the AP and an incumbent transmission received from the incumbent device based on the one or more incumbent signal parameters; and generate an incumbent avoidance beam, wherein the incumbent avoidance beam is configured to transmit in one or more operating directions to avoid the incumbent device. The transceiver may be configured to transmit the incumbent avoidance beam in the one or more operating directions.

An access point (AP) may include a transceiver configured to receive a backhaul transmission from a backhaul device; and a processing device. The processing device may be configured to detect the backhaul transmission from the backhaul device; and compute an angle of arrival between the AP and the backhaul transmission from the backhaul device. The backhaul transmission may be detected using one or more of: a signaling aid in the backhaul transmission, or an AP preamble in the backhaul transmission, or a correlation between the backhaul transmission and one or more of a backhaul preamble or a backhaul pilot.

As illustrated in FIG. 1, an example diagram is provided showing service paths (e.g., 102) of microwave links that may be 6 GHz communication systems (e.g., 104) in an example service area 100 (e.g., a specific city). An access point (AP) (e.g., a Wi-Fi® AP configured to operate in a 6 GHz frequency band) may obtain service paths (e.g., 102) associated with incumbent systems (e.g., 6 GHz communication systems 104) in the service area 100 from one or more of an AFC database or by measuring/detecting the service paths (e.g., without using an AFC database). The AP may be configured to determine a distance between the AP and the backhaul device and/or incumbent systems (e.g., 6 GHz communication systems 104). The AP may be configured to determine interference between transmissions from the AP and one or more backhaul devices and/or incumbent systems (e.g., 6 GHz communication systems 104) and the AP may be configured to determine whether to (i) transmit in a standard power mode, (ii) transmit in a low power mode, (iii) transmit in a very low power mode, or (iv) not transmit.

Various regulations and proposals from governmental and industry sources may impact use of the 6 GHz frequency band. The FCC has promulgated regulations affecting the permissible interference to noise (I/N) ratio in the 6 GHz frequency band. For example, the I/N ratio may not exceed-6 decibels (dB) in the 6 GHz frequency band. In some areas of Europe, other interference proposals have been set forth relating to a long term interference criteria in which the I/N ratio may not exceed −10 dB (or alternatively −20 dB) for a selected percentage of time (e.g., 20%). In some areas of Europe, proposals have been set forth such relating to the short-term interference criteria in which the I/N ratio may not exceed 19 dB for greater than $4.5 \times 10^{-4}\%$ of the time in any month (as a percentage of error seconds).

Industry groups have proposed various differences from these governmental regulations and proposals. These counter proposals to the FCC 6 GHz regulations have been presented by interested parties, such as the Wi-Fi® Alliance (WFA). Some of the counter proposals have included one or more variations to: (1) operational radio bands (e.g., Unlicensed National Information Infrastructure (UNII) frequency bands), (2) applicability of low power APs, and (3) additional power modes (e.g., transmit power classes).

For example, the WFA has requested an additional 100 MHz to be allocated for use in the UNII-8 frequency band. The UNII-8 frequency band may correspond to communications including frequencies between 6.875 GHz and 7.125 GHz. Other frequency bands that may be included for use in 6 GHz communications include one or more of UNII-5 (5.925 GHz and 6.425 GHz), UNII-6 (6.425 GHz and 6.525 GHz), or UNII-7 (6.525 GHz and 6.875 GHz).

The WFA has also requested removing indoor limitations associated with low-power operation in the 6 GHz frequency band. The FCC, alternatively, has requested limits on the use of low power 6 GHz communications to be indoor.

The WFA has also requested an additional class of 6 GHz communications to operate using very low power. The various transmit power classes may include: (1) standard power transmissions that may include transmissions having a power of up to about 36 dBm, (2) low power transmissions that may include transmissions having a power of up to about 30 dBm, (3) and very low power transmissions that may include transmissions having a power of up to about 14 dBm. As requested by the WFA, the very low power transmit power class may be used in short-range applications (e.g., for portable APs).

The WFA has also requested that client devices (e.g., user equipment receiving wireless communications from the AP) use a transmit power class that matches the transmit power class of the corresponding AP. For example, a client device, that is receiving wireless communications from an AP that is transmitting in a low-power transmit power class, may use low-power transmit power class for wireless communications to the AP.

To comply with this request by the WFA, one or more of the AP or the client device may include a transmit power class control, configured to match the transmit power class used by the client device to the transmit power class used by the AP.

Figure 2:
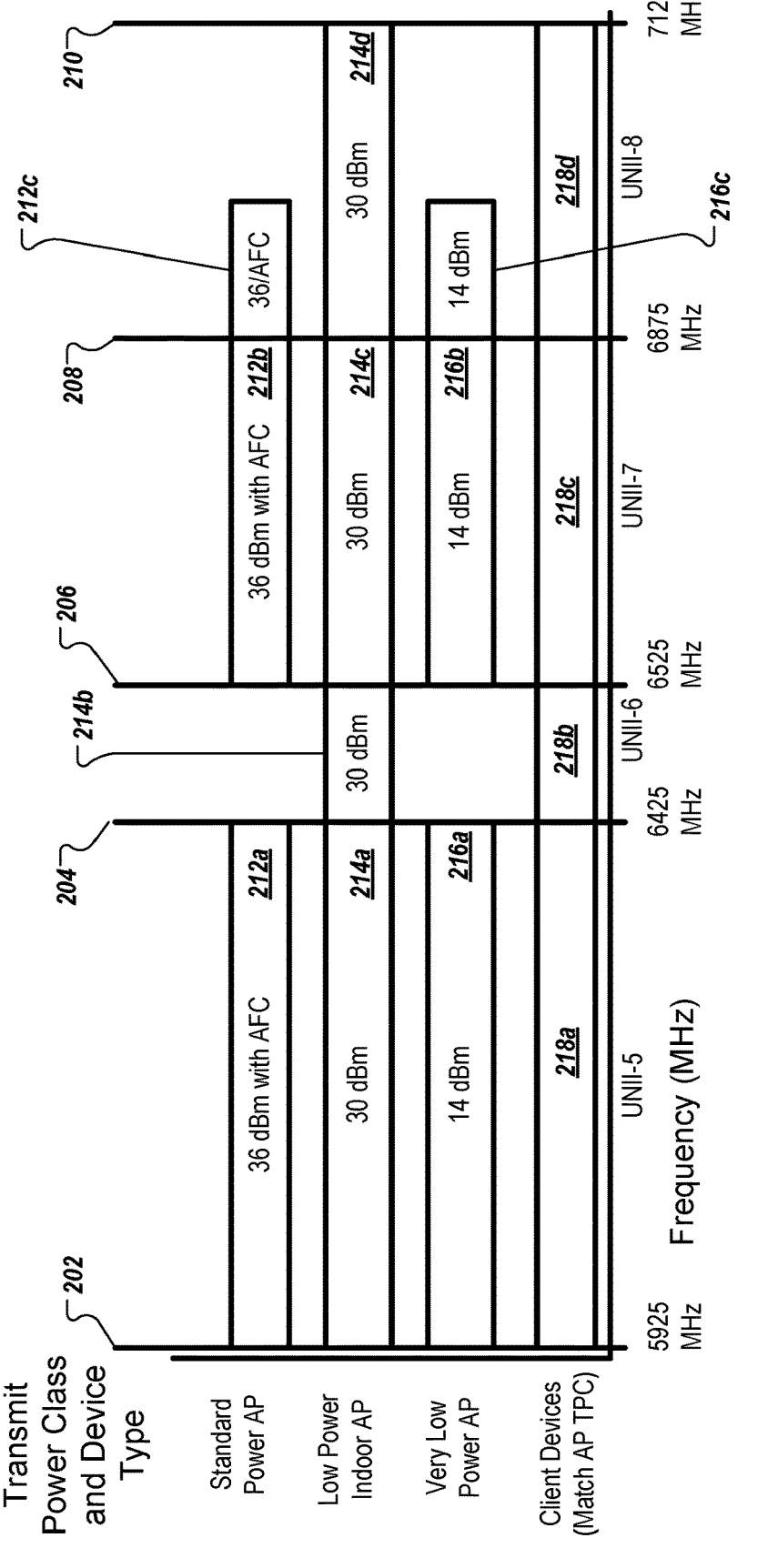
FIG. 2 illustrates a graph showing the transmit power class and device type as a function of frequency in megahertz (MHz).
Figure 3:
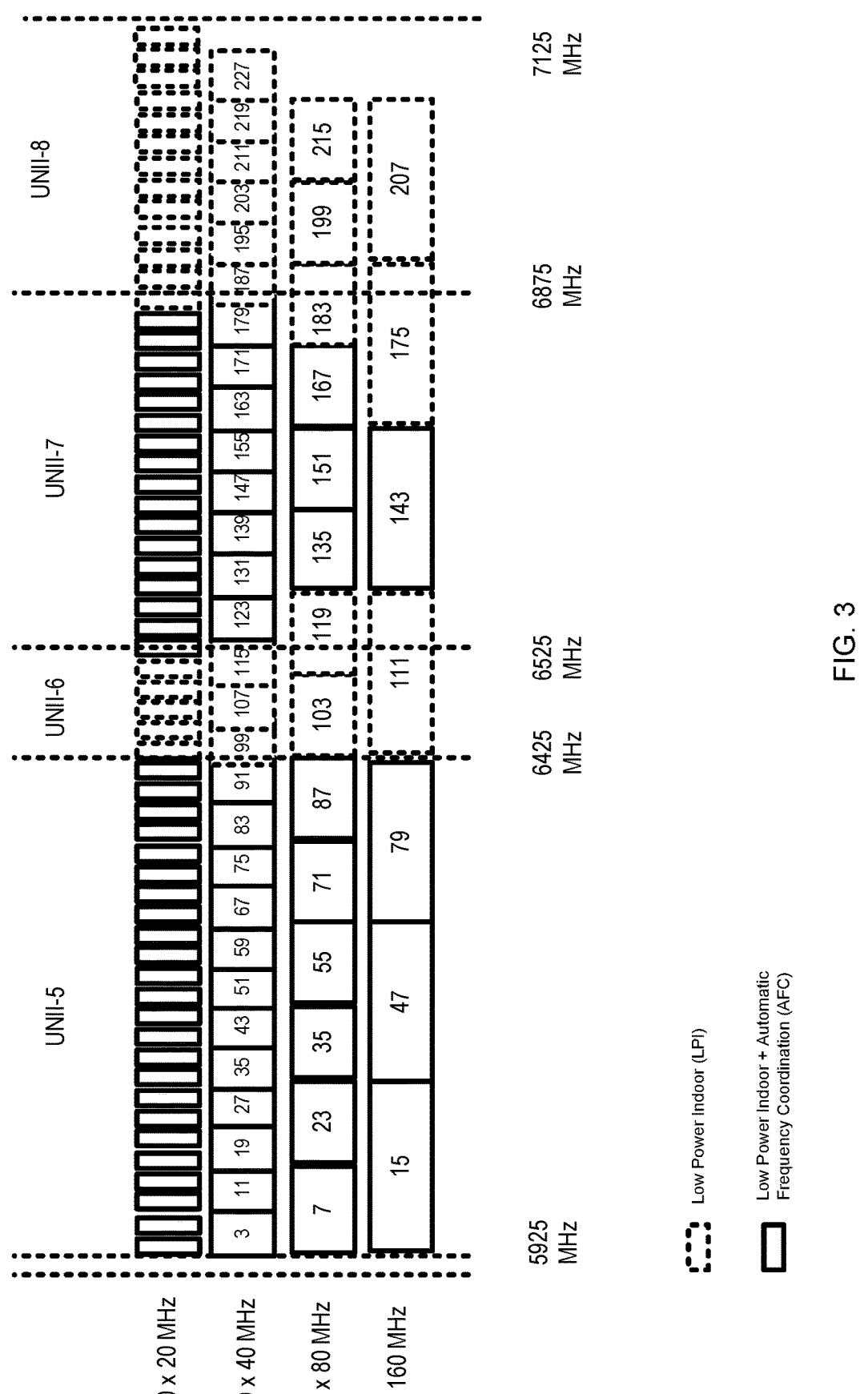
FIG. 3 illustrates an example of 6 gigahertz (GHz) channels.

FIG. 2 illustrates some of the counter proposals to the FCC regulations. FIG. 3 and Table I provide a summary of some of the FCC regulations. FIG. 2 provides a graph 200 showing the transmit power class and device type as a function of frequency in megahertz (MHz). The 6 gigahertz (GHz) frequency band may include 4 frequency sub-bands: (i) UNII-5 having a frequency range of from 5925 MHz (202) to 6425 MHz (204), (ii) UNII-6 having a frequency range of from 6425 MHz (204) to 6525 MHz (206), (iii) UNII-7 having a frequency range of from 6525 MHz (206) to 6875 MHz (208), or (iv) UNII-8 having a frequency range of from 6875 MHz (208) to 7125 MHz (210).

When APs are allocated bandwidth by an AFC server, the APs may be permitted to operate using a standard power transmit power class. For standard power APs, the maximum transmit power may be an effective isotropic radiated power (EIRP) of about 36 decibel milliwatts (dBm) for: (a) APs operating within the UNII-5 frequency sub-band, as shown by 212a, (b) for APs operating within the UNII-7 frequency sub-band, as shown by 212b, or (c) for APs operating within a portion of the UNII-8 frequency sub-band, as shown by 212c.

When APs are not allocated bandwidth by an AFC server, the APs may be permitted to operate using a low power indoor (LPI) transmit power class. For APs operating in an LPI transmit power class, the maximum permitted transmit power may be an EIRP of about 30 dBm for: (a) APs operating within the UNII-5 frequency sub-band, as shown by 214a, (b) for APs operating within the UNII-6 frequency sub-band, as shown by 214b, (c) for APs operating within the UNII-7 frequency sub-band, as shown by 214c, or (d) for APs operating within the UNII-8 frequency sub-band, as shown by 214d. The maximum permitted transmit power may differ from 30 dBm under different regulatory agencies or under different standards (e.g., as promulgated by European Telecommunications Standards Institute (ETSI)).

APs operating using the very low power transmit power class, as proposed by WFA, may be used in short-range applications (e.g., for portable APs). For APs operating in a very low power transmit power class, the maximum permitted transmit power may be an EIRP of about 14 dBm for: (a) APs operating within the UNII-5 frequency sub-band, as shown by 216a, (b) for APs operating within a UNII-7 frequency sub-band, as shown by 216b, or (c) for APs operating within a portion of the UNII-8 frequency sub-band, as shown by 216c.

The WFA has further proposed that client devices use a transmit power that match one or more of the transmit power or the transmit power class for the corresponding AP. That is, for client devices that operate in the 6 GHz frequency band, a client device may: (i) match a standard power transmit power class when the corresponding AP uses a standard power transmit power class; (ii) match a low power indoor transmit power class when the corresponding AP uses a low power indoor transmit power class; or (iii) match a very low power transmit power class when the corresponding AP uses a very low power transmit power class. The clients devices may be configured to match the transmit power class for the corresponding AP across the 6 GHz frequency band, as shown by 218a, 218b, 218c, and 218d.

Table I provides an example of the FCC regulations for the 6 GHz frequency band. For a channel bandwidth of from about 20 MHz to about 320 MHz (e.g., for a channel bandwidth of 20 MHz, or 40 MHz, or 80 MHz, or 160 MHz, or 320 MHz), the antenna gain in dBi may be 3 (or a maximum or 6 dBi).

For LPI operation, the maximum power spectral density (PSD) may be fixed at 5 dBm/MHz for a channel bandwidth of from about 20 MHz to about 320 MHz (e.g., for a channel bandwidth of 20 MHz, or 40 MHz, or 80 MHz, or 160 MHz, or 320 MHz). The maximum radio frequency (RF) output power may be: (a) 15 dBm for a channel bandwidth of 20 MHZ, (b) 18 dBm for a channel bandwidth of 40 MHZ, (c) 21 dBm for a channel bandwidth of 80 MHz, (d) 24 dBm for a channel bandwidth of 160 MHz, or (e) 27 dBm for a channel bandwidth of 320 MHz. The maximum EIRP may be: (a) 18 dBm for a channel bandwidth of 20 MHz, (b) 21 dBm for a channel bandwidth of 40 MHz, (c) 24 dBm for a channel bandwidth of 80 MHz, (d) 27 dBm for a channel bandwidth of 160 MHz, or (e) 30 dBm for a channel bandwidth of 320 MHz.

TABLE I

FCC Regulations Impacting 6 GHz channels in the United States.

| | | | Low Power Indoor (LPI) | | Standard Power AP | |
|---|---|---|---|---|---|---|
| Channel Bandwidth (MHz) | Antenna Gain (dBi) | PSD (dBm/MHz) | RF Output Power (dBm) | EIRP (dBm) | RF Output Power (dBm) | EIRP (dBm) |
| 20 | 3 | 5 | 15 | 18 | 33 | 36 |
| 40 | 3 | 5 | 18 | 21 | 33 | 36 |
| 80 | 3 | 5 | 21 | 24 | 33 | 36 |
| 160 | 3 | 5 | 24 | 27 | 33 | 36 |
| 320 | 3 | 5 | 27 | 30 | 33 | 36 |

For standard power operation, the maximum RF output power may be 33 dBm for a channel bandwidth of from about 20 MHz to about 320 MHz (e.g., for a channel bandwidth of 20 MHz, or 40 MHz, or 80 MHz, or 160 MHz, or 320 MHz). The maximum EIRP may be 36 for a channel bandwidth of from about 20 MHz to about 320 MHz (e.g., for a channel bandwidth of 20 MHz, or 40 MHz, or 80 MHz, or 160 MHz, or 320 MHz).

For other channel bandwidths (e.g., 640 MHz, 1280 MHz, or the like), one or more of the RF or the EIRP may increase by 3 dBm for LPI when the bandwidth doubles, or one or more of the RF or the EIRP may be constant when standard power is used. For example, for a channel bandwidth of 640

MHz: the RF output power may be 30 dBm for LPI and the EIRP may be 33 dBm for LPI; or the RF output power may be 33 for standard power or the EIRP may be 36 for standard power. For a channel bandwidth of 1280 MHz: the RF output power may be 33 dBm for LPI and the EIRP may be 36 dBm for LPI; or the RF output power may be 33 for standard power or the EIRP may be 36 for standard power.

FIG. 3 illustrates an example of 6 GHz channels in the United States. When the channel bandwidth is 160 MHz, 7 different channels in the 6 GHz frequency band may be used including: channels 15, 47, and 79 in the UNII-5 sub-band; channel 111 in the UNII-6 and UNII-7 sub-bands; channels 143 in the UNII-7 sub-band; channel 175 in the UNII-7 and UNII-8 sub-bands; and channel 207 in the UNII-8 sub-band. Channels 15, 47, 79, and 143 may be operable in one or more of a low power indoor transmit power class and in a standard power class in coordination with an AFC server. Channels 111, 175, and 207 may be operable in a low power indoor transmit power class.

When the channel bandwidth is 80 MHz, 14 different channels in the 6 GHz frequency band may be used including: channels 7, 23, 39, 55, 71, and 87 in the UNII-5 sub-band; channel 103 in the UNII-6 sub-band; channel 119 in the UNII-6 and UNII-7 sub-bands; channels 135, 151, and 167 in the UNII-7 sub-band; channel 183 in the UNII-7 and UNII-8 sub-bands; channels 199 and 215 in the UNII-8 sub-bands. Channels 7, 23, 35, 55, 71, 87, 135, 151, and 167 may be operable in one or more of a low power indoor transmit power class and in a standard power class in coordination with an AFC server. Channels 103, 119, 183, 199, and 215 may be operable in a low power indoor transmit power class.

When the channel bandwidth is 40 MHz, 29 different channels in the 6 GHz frequency band may be used including: channels 3, 11, 19, 27, 35, 43, 51, 59, 67, 75, 83, and 91 in the UNII-5 frequency sub-band; channels 99 and 107 in the UNII-6 frequency sub-band; channel 115 in the UNII-6 and UNII-7 frequency sub-bands; channels 123, 131, 139, 147, 155, 163, 171, and 179 in the UNII-7 frequency sub-band; channel 187 in the UNII-7 and UNII-8 frequency sub-bands; channels 195, 203, 211, 219, and 227 in the UNII-8 frequency sub-band. Channels 3, 11, 19, 27, 35, 43, 51, 59, 67, 75, 83, 91, 123, 131, 139, 147, 155, 163, 171, and 179 may be operable in one or more of a low power indoor transmit power class and in a standard power class in coordination with an AFC server. Channels 99, 107, 115, 187, 195, 203, 211, 219, and 227 may be operable in a low power indoor transmit power class.

When the channel bandwidth is 20 MHz, 59 different channels in the 6 GHz frequency band may be used including: channels 1, 5, 9, 13, 17, 21, 25, 29, 33, 37, 41, 45, 49, 53, 57, 61, 65, 69, 73, 77, 81, 85, 89, and 93 in the UNII-5 frequency sub-band; channels 97, 101, 105, 109, and 113 in the UNII-6 frequency sub-band; channels 117, 121, 125, 129, 133, 137, 141, 145, 149, 153, 157, 161, 165, 169, 173, 177, and 181 in the UNII-7 frequency sub-band; channel 185 in the UNII-7 and UNII-8 frequency sub-bands; channels 189, 193, 197, 201, 205, 209, 213, 217, 221, 225, 229, and 233 in the UNII-8 frequency sub-band. Channels 1, 5, 9, 13, 17, 21, 25, 29, 33, 37, 41, 45, 49, 53, 57, 61, 65, 69, 73, 77, 81, 85, 89, 93, 117, 121, 125, 129, 133, 137, 141, 145, 149, 153, 157, 161, 165, 169, 173, 177, and 181 may be operable in one or more of a low power indoor transmit power class and in a standard power class in coordination with an AFC server. Channels 97, 101, 105, 109, 113, 185, 189, 193, 197, 201, 205, 209, 213, 217, 221, 225, 229, and 233 may be operable in a low power indoor transmit power class.

Embodiments of the present disclosure will be explained with reference to the accompanying drawings.

Figure 4A:
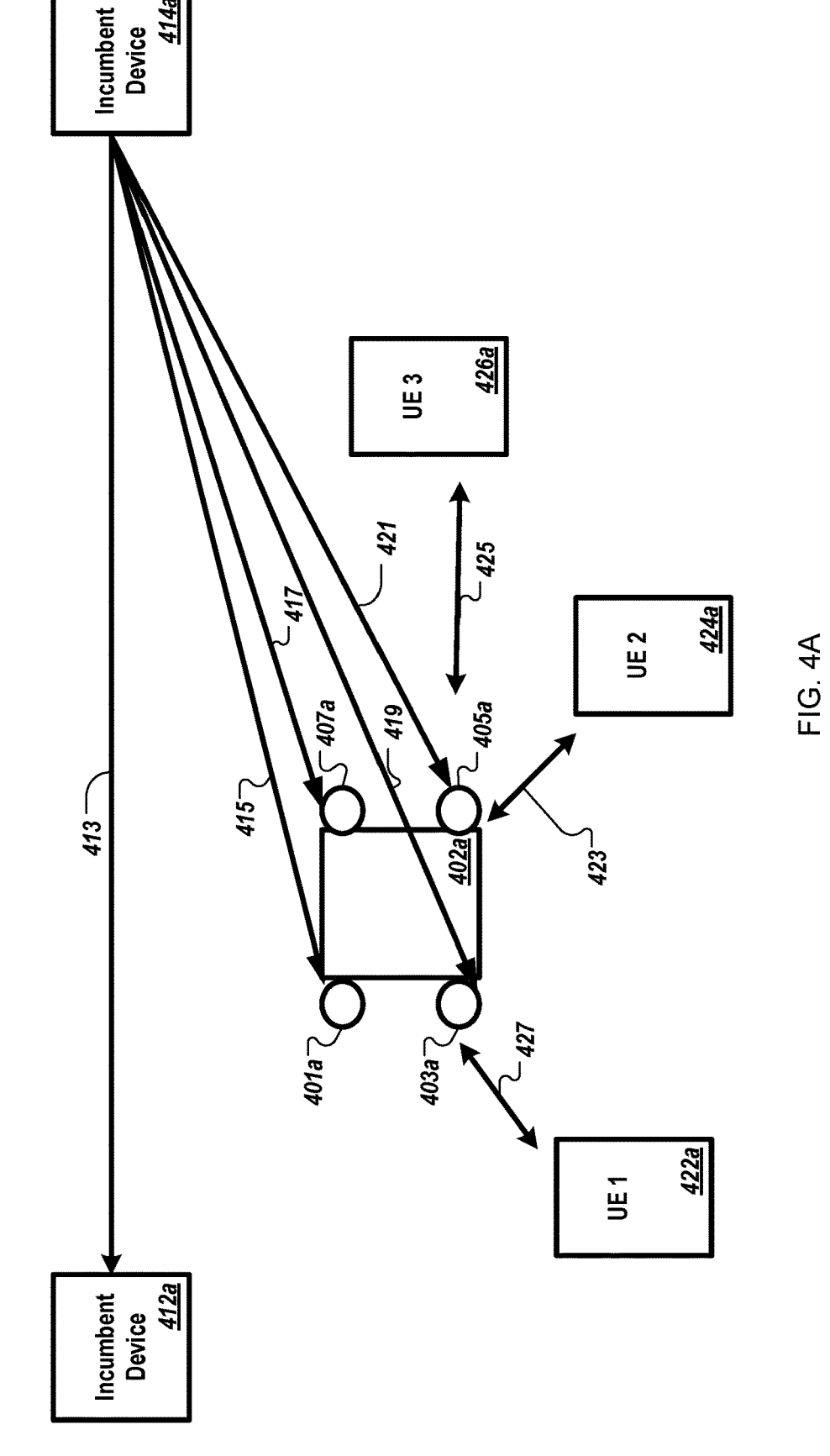
FIG. 4A illustrates an example system architecture of access point (AP) angle of arrival (AoA) interference reduction for incumbent devices.

FIG. 4A illustrates an example system architecture 400a for AP interference reduction based on angle of arrival between an AP 402a and an incumbent device 412a, 414a. The AP 402a may have hardware to measure one or more signals received from one or more incumbents 412a, 414a (e.g., fixed wireless microwave links). The AP 402a may include one or more antennas 401a, 403a, 405a, 407a. The one or more antennas 401a, 403a, 405a, 407a may be configured to detect interference from one or more incumbent devices 412a, 414a. The interference from the one or more incumbent devices 412a, 414a may include one or more incumbent transmissions paths 415, 417, 419, and 421 which may be detected at one or more antennas 401a, 403a, 405a, 407a of the AP 402a. For example, the incumbent device 414a may be configured to radiate the transmission 413 to incumbent device 412a, which may result in radiating incumbent transmission path 415 to the AP 402a. Similarly, radiation from the transmission 413 may result in radiation of the incumbent transmission paths 417, 419, and 421 to the one or more antennas 407a, 403a, and 405a, respectively.

The one or more antennas 401a, 403a, 405a, 407a may be distributed about the AP 402a. For example, the one or more antennas 401a, 403a, 405a, 407a may be uniformly distributed around an exterior portion of the AP 402a. Alternatively, or additionally, the one or more antennas 401a, 403a, 405a, 407a may be randomly distributed about the AP 402a, including the exterior portion or an interior portion. The AP 402a may be configured to use the distribution and/or orientation of the one or more antennas 401a, 403a, 405a, 407a to determine an approximate angle of arrival of a transmission received from an incumbent device (e.g., incumbent devices 412a, 414a, a backhaul device 445, as illustrated in FIGS. 4C and 4D, or the like).

The AP 402a may be configured to compute an angle of arrival between the AP 402a and the incumbent device 414a. The angle of arrival may be computed using one or more of: spatial diversity, pattern diversity, polarization diversity, or the like.

When spatial diversity is used, the angle of arrival may be computed by measuring a received signal parameter at the one or more antennas 401a, 403a, 405a, and 407a. The difference in the received signal parameter at the one or more antennas 401a, 403a, 405a, and 407a may be used to predict an angle of arrival from the incumbent device 414a by correlating the signal received by each antenna based on the signal parameter including one or more of: a signal strength, a time stamp, a frequency, an amplitude, a phase shift, or the like. The angle of arrival may be the direction from which the signal was received relative to the position of the AP 402a. Alternatively or in addition, the signal received by each antenna may be correlated using a correlation between an incumbent preamble, an incumbent pilot, or the like.

When pattern diversity is used, the angle of arrival may be computed by using one or more antennas 401a, 403a, 405a, and 407a that are directional antennas. The signal received by each directional antenna may be correlated based on one or more signal parameters including one or more of: a signal strength, a time stamp, a frequency, an amplitude, a phase shift, or the like. Alternatively or in addition, the signal received by each antenna may be correlated using a correlation between an incumbent preamble, an incumbent pilot, or the like. The directional antennas may be separated in space so that the directional antennas may determine an angle of arrival within a selected margin of error based on the correlation of the one or more signal parameters.

When polarization diversity is used, the angle of arrival may be computed by using one or more antennas 401a, 403a, 405a, and 407a that may be antennas having different polarizations. The difference in polarization may be used to correlate different signals.

The different received signals received at the one or more antennas 401a, 403a, 405a, 407a may be combined using a suitable technique such as a maximal-ratio combiner, an equal-gain combiner, a scanning-switching combiner, a selection combiner, or the like. The different combination techniques may be used to compute the correlation between the different received signals, which may be used to compute an angle of arrival between the AP 402a and the incumbent device 414a.

The AP 402a may be configured to transmit a wireless signal (e.g., a Wi-Fi® signal) to one or more stations (STA) or user equipment (UE) (e.g., UE 1 422a, UE 2 424a, UE 3 426a, or the like). The wireless signal 421 (e.g., a Wi-Fi® signal) between AP 402a and UE 1 422a, the wireless signal 423 between AP 402a and UE 2 424a, and the radiation path 425 between 402a and UE 3 426a may be transmitted using any suitable wireless signal in a suitable frequency (e.g., UNII-5, UNII-6, UNII-7, or UNII-8 frequency sub-bands).

Modifications, additions, or omissions may be made to the AP 402a without departing from the scope of the present disclosure. For example, in some implementations, the AP 402a may include any number of other components that may not be explicitly illustrated or described.

Figure 4B:
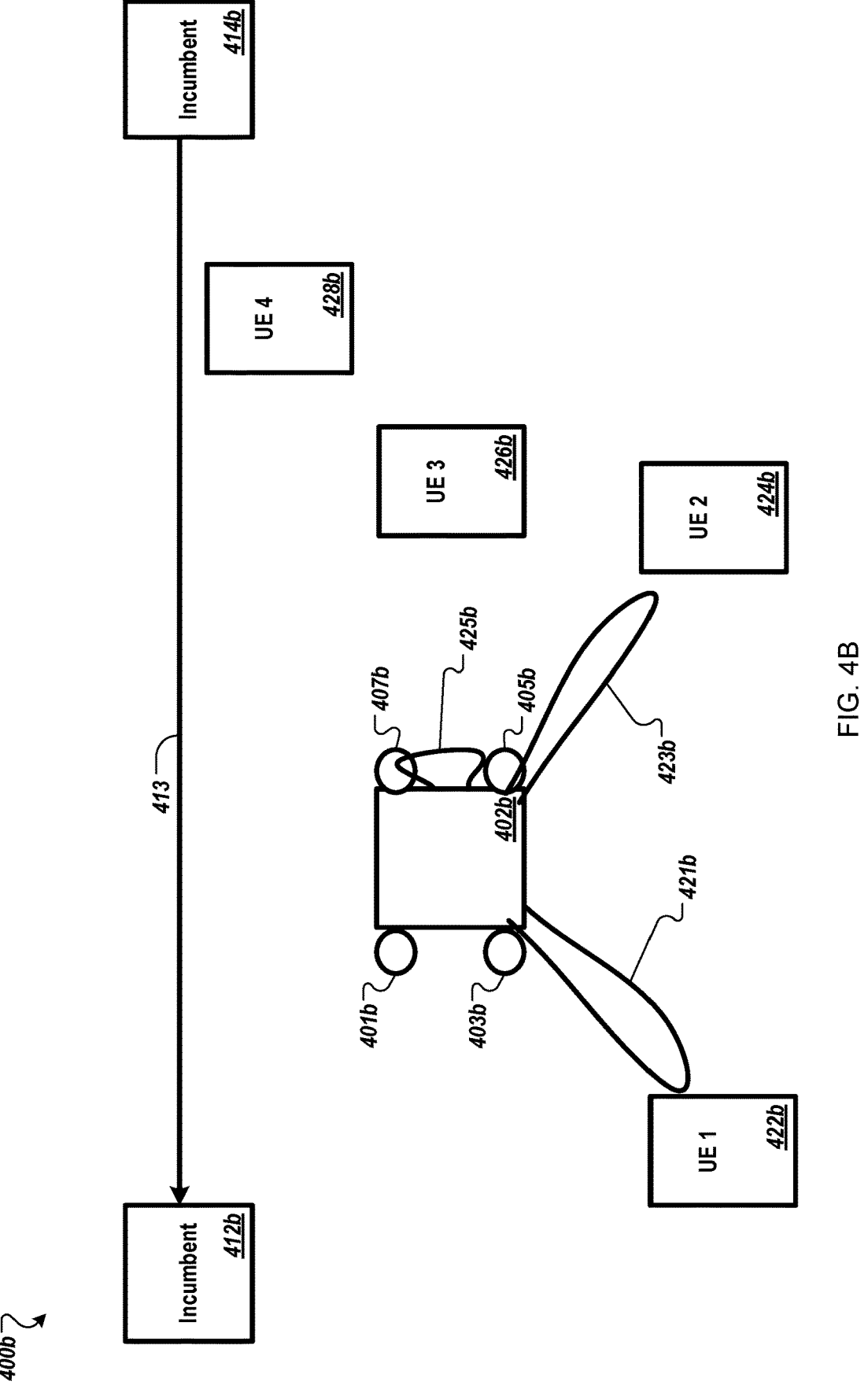
FIG. 4B illustrates an example system architecture of AP AoA interference reduction for incumbent devices.
Figure 4C:
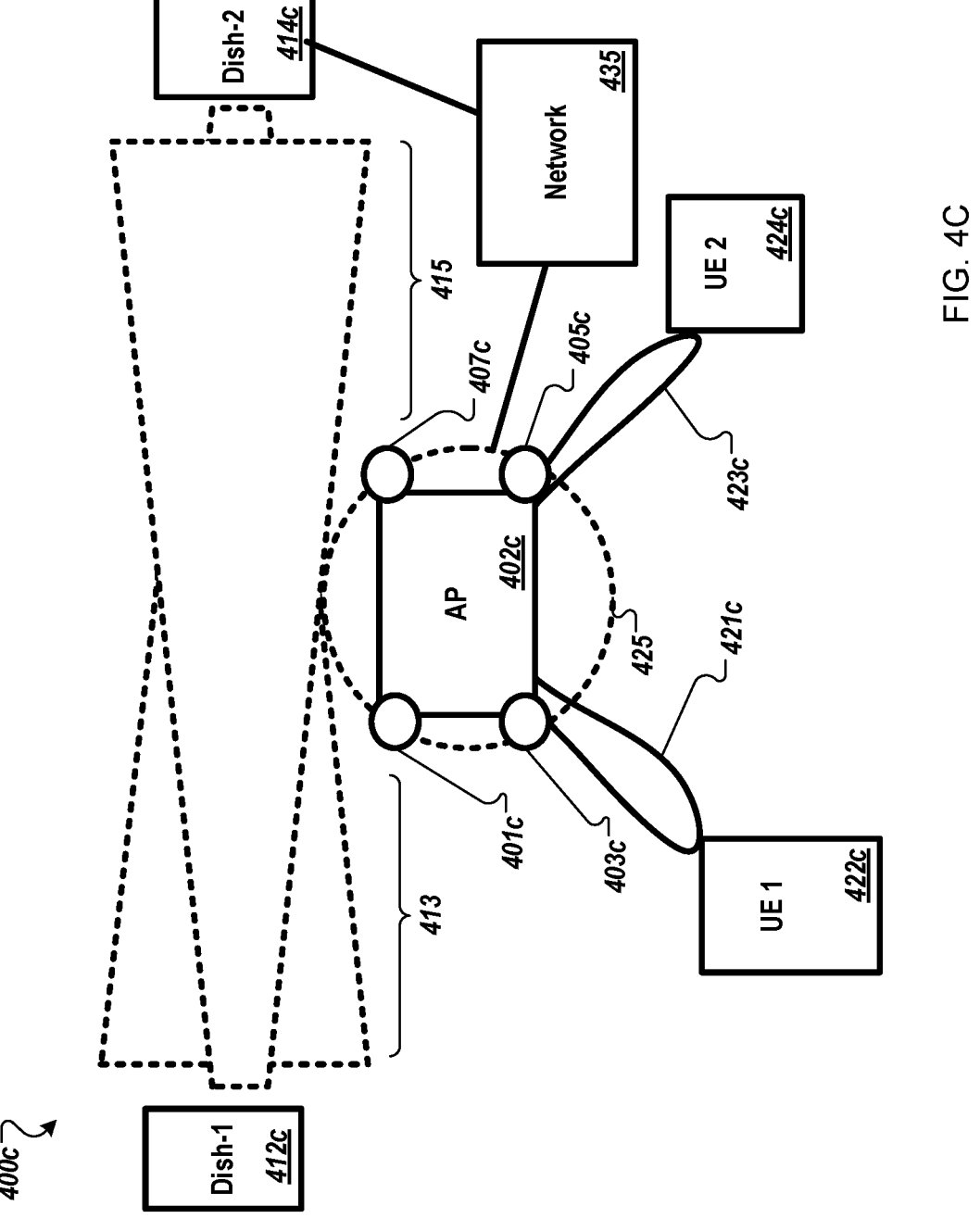
FIG. 4C illustrates an example system architecture of AP AoA interference reduction for backhaul devices.
Figure 4D:
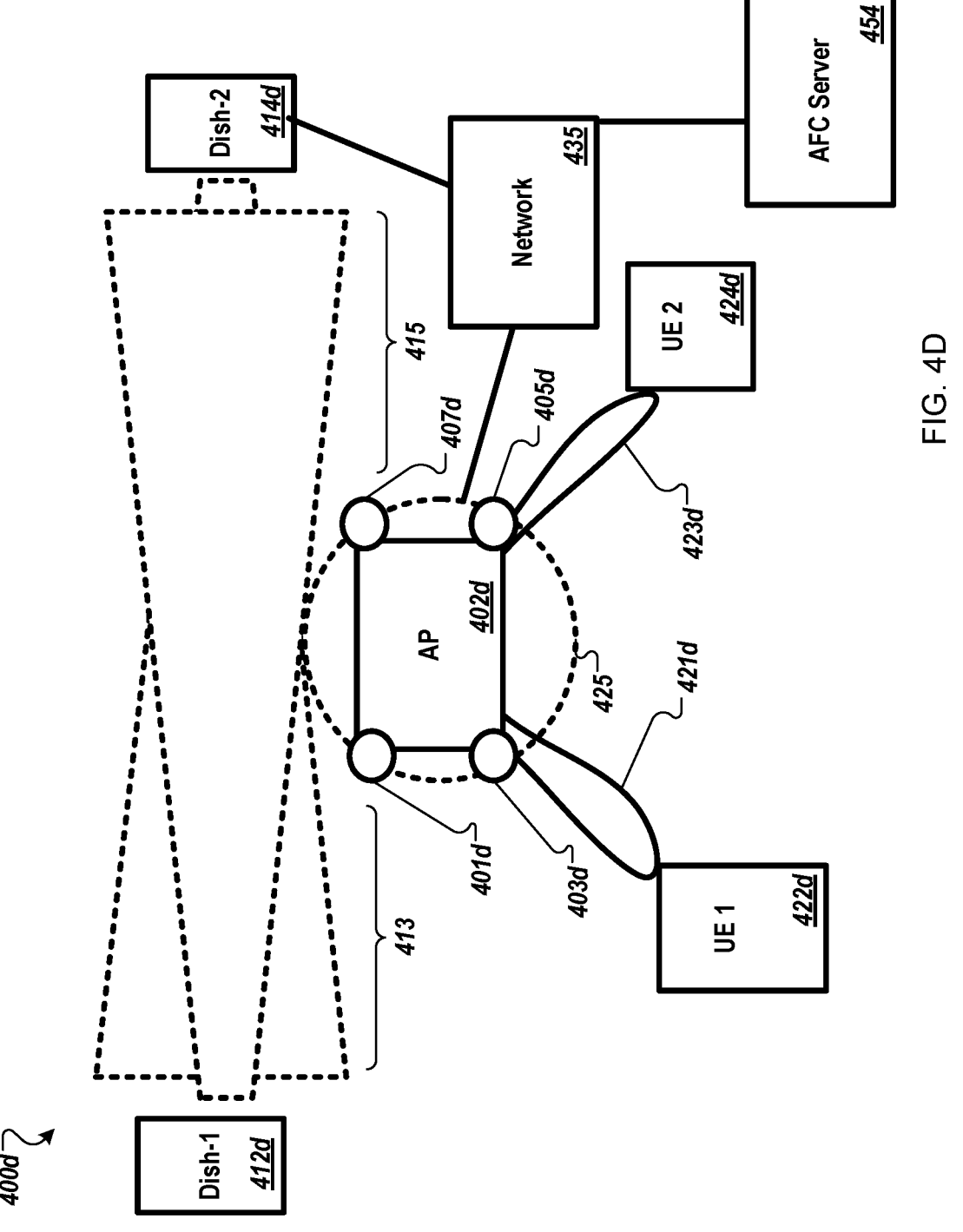
FIG. 4D illustrates an example system architecture of AP AoA interference reduction for backhaul devices.

As illustrated in FIG. 4B, example system architecture 400b may include an AP 402b that may be configured using multiple-input and multiple-output (MIMO) to generate an incumbent avoidance beam to clients (e.g., stations, user equipment, or the like). The AP 402b may be configured to transmit the incumbent avoidance beam in one or more operating directions to facilitate avoidance of the incumbent device 412b, 414b. The AP 402b may include one or more antennas 401b, 403b, 405b, and 407b.

The incumbent avoidance beam may be any suitable beam configured to avoid the incumbent device 412b, 414b. The incumbent avoidance beam may include a standard power notch in the one or more operating directions (i.e., the directions that avoid the one or more incumbent devices 412b, 414b). The incumbent avoidance beam may include a low power indoor notch toward the angle of arrival between the AP 402b and the one or more incumbent devices 412b, 414b. The incumbent avoidance beam may include a null pattern toward the angle of arrival between the AP 402b and the one or more incumbent devices 412b, 414b.

The AP 402b may be configured to generate one or more antenna radiation patterns (e.g., 401b, 421b, 423b, 425b) that may reduce interference with incumbent communications (e.g., communications between a first incumbent device 412b and a second incumbent device 414b). As shown, the AP 402b may be configured to generate an antenna radiation pattern 421b for communications with a communicatively coupled device (e.g., UE 1 422b) and an antenna radiation pattern 423b for communications with a different communicatively coupled device (e.g., UE 2 424b) that may reduce and/or limit an amount of interference with the incumbent devices 412b, 414b.

For example, the antenna radiation patterns 421b and 423b may include a main lobe that may be arranged to reduce interference with the transmissions 413 between the incumbent devices 412b, 414b by being directed away from an angle toward the incumbent devices 412b, 414b. A transmission may be robust in the direction of the main lobe and may be weak in side lobe directions. Transmission, for example, may be close to zero in the areas between the main lobe and side lobe and between separate side lobes. This may be referred to as an antenna null. In beamforming, various antennas in an array may be given a same signal with phase shifts or delays to form the beam in a desired direction. This electronically steered antenna array may include the main lobe, side lobes, and nulls. A null may be created in the order of the path of the microwave beam to have less interference in that path.

For wireless devices that are positioned at an angle that would interfere with the incumbent devices 412b, 414b, a low power indoor notch (e.g., 425b) may be used to prevent interference in the direction of the communicatively coupled device (e.g., UE 3 426b). For wireless devices that are positioned at an angle that would interfere with the incumbent devices 412b, 414b when a low power indoor notch is used, an antenna null may be used. For example, UE 4 428b may not receive a beam from the AP 402b to prevent interference with incumbent 414b.

Modifications, additions, or omissions may be made to the AP 402b without departing from the scope of the present disclosure. For example, the AP 402b may include any number of other components that may not be explicitly illustrated or described.

As illustrated in FIG. 4C, the system architecture 400c may include an AP 402c, a network 435 (e.g., the internet, which may be configured to communicate with an AFC server), a first incumbent device (e.g., dish-1 412c), and a second incumbent device (e.g., dish-2 414c, which may include a backhaul device). The first dish (e.g., dish-1 412c) may be configured to communicate a first transmission 413 to the second dish (e.g., dish-2 414c), and the second dish (e.g., dish-2 414c) may be configured to communicate a second transmissions 415 to the first dish (e.g., dish-1 412c). The AP 402c may be a Wi-Fi® AP. The Wi-Fi® AP may be configured to provide Wi-Fi® to devices that may be communicatively coupled to the AP 402c using a 6 GHz frequency band including one or more of the UNII-5, UNII-6, UNII-7, or UNII-8 sub-bands. The AP 402c may be configured to radiate a radiation pattern (e.g., 421c, 423c, 425, or the like) that may be in between the transmission path between the first dish (e.g., dish-1 412c) and the second dish (e.g., dish-2 414c). As illustrated, dish-1 412c and dish-2 414c may form a microwave link path (e.g., transmission 413 which may be a microwave link path and transmissions 415, which may be a microwave link path) in which the AP 402c has a radiation pattern 425 in the communication path. Dish-2 414c may receive an interfering signal 447 (e.g., an interfering Wi-Fi® signal) from the AP 402c.

The AP 402c may include one or more antennas 401c, 403c, 405c, 407c. The one or more antennas 401c, 403c, 405c, 407c may be configured to detect interference from one or more incumbent devices (e.g., dish-1 412c and dish-2 414c), or a combination thereof. The interference from the one or more incumbent devices (e.g., dish-1 412c and dish-2 414c), or a combination thereof may include one or more incumbent transmission beams, or a combination thereof, which may be detected at one or more antennas 401c, 403c, 405c, 407c of the AP 402c.

The one or more antennas 401c, 403c, 405c, 407c may be distributed about the AP 402c, as described with respect to the one or more antennas 401a, 403a, 405a, 407a in FIG. 4A.

The AP 402c may be configured to compute an angle of arrival between the AP 402c and the one or more incumbent devices (e.g., dish-1 412c and dish-2 414c), or a combination thereof. The angle of arrival may be computed using one or more of: spatial diversity, pattern diversity, polarization diversity, or the like, as described with respect to FIG. 4A.

One or more backhaul transmissions may be detected using one or more of: a signaling aid in the backhaul transmissions, an AP preamble in the backhaul transmissions, a correlation between the one or more backhaul transmissions and one or more of a backhaul preamble or a backhaul pilot in the backhaul transmissions.

A "signaling aid" may be a signal added to a backhaul frame to facilitate detection by an AP 402c (e.g., a Wi-Fi® AP) without being used for detection between backhaul devices (e.g., backhaul modems). In one example, the signaling aid may be added to the backhaul frame (e.g., before a backhaul frame) instead of being embedded within (e.g., between different symbols of a backhaul frame) the backhaul frame. The signaling aid may be suitable for facilitating detection by the AP 402c of the backhaul device (e.g., backhaul modem). In one example, the signaling aid may be an AP transmission preamble. The AP transmission preamble may be one or more of: a legacy short training field (L-STF), legacy long training field (L-LTF), or legacy signal field (L-SIG). These transmission preambles may be detected by the AP 402c.

The signaling aid may be configured to facilitate detection by the AP 402c without being aligned to a wireless local area network (e.g., Wi-Fi®) raster. In this example, the signaling aid may be detected by a wireless local area network that may be configured to select frequency channels having a low interference by performing a channel availability check (CAC) by using a channel allocation scheme (e.g., dynamic frequency selection (DFS)).

The signaling aid may be configured for detection at a Wi-Fi® AP. That is, the signaling aid may use OFDM modulation and have a carrier spacing that is the same as the carrier spacing of one or more of WiFi® L-STF or WiFi® L-LTF. The modulated sequence may be generated to identify the transmitting device as a backhaul device (e.g., a backhaul modem) instead of a Wi-Fi® AP.

The signaling aid may be inserted into a downlink signal from a backhaul device (e.g., backhaul modem) in any suitable pattern to facilitate detection by an AP 402c (e.g., a Wi-Fi® AP). The pattern may be a periodic pattern in which the signaling aid may be inserted into the downlink signal based on a selected time period (e.g., 20 µs, 40 µs, 80 µs, 200 µs, 1 ms, 5 ms, 50 ms, 200 ms, 1 s, 5 s, 15 s, 30 s, or the like) or a selected number of frame, subframes, or the like. In one example, the processing device may be configured to encode, at the backhaul device (e.g., backhaul modem), the signaling aid in combination with one or more backhaul frames in one or more backhaul signals periodically (e.g., in a periodic pattern based on a selected time period or a selected number of frames, subframes, or the like). The signaling aid may have a power spectral density (PSD) that may be configured to conform to a backhaul signal PSD. That is, the signaling aid may match the PSD for a downlink signal transmitted from a backhaul device (e.g., backhaul modem).

The signaling aid may be configured to be detected by an AP 402c in various ways. In one example, the signaling aid may be configured to be detectable by the AP 402c µsing dynamic frequency selection. The signaling aid may be configured to have a bandwidth of one or more of: 3.5 MHz, 7 MHz, 14 MHZ, 28 MHz, or 56 MHz. The AP 402c may be configured to identify the signaling aid to identify the received signal as a backhaul signal.

The signaling aid may include a suitable physical layer protocol data unit (PPDU) that may include a transmission vector format including one or more of: extremely high throughput (EHT), wake up radio (WUR), high efficiency (HE), directional multi-gigabit (DMG), sub-1-GHz (S1G), very-high-throughput (VHT), high-throughput (HT), non-HT, or the like. The PPDU may include any suitable modulation format including one or more of: direct sequence spread spectrum (DSSS) and complementary code keying (CCK); orthogonal frequency-division multiplexing (OFDM); single carrier and OFDM; orthogonal frequency-division multiple access (OFDMA); multi-carrier on-off keying (MC-OOK), or the like. The PPDU field structure may include any suitable field structure including one or more fields including one or more of: legacy short training field (L-STF), legacy long training field (L-LTF), legacy signal field (L-SIG), repeated legacy signal field (RL-SIG), universal signal field (U-SIG), EHT signal field (EHT-SIG), EHT short training field (EHT-STF), EHT long training field (EHT-LTF), EHT data field (EHT-Data), packet extension field (PE), binary phase-shift keying mark 1 field (BPSK-Mark1), BPSK mark 2 field (BPSK-Mark2), WUR synchronization field (WUR-Sync), WUR data field (WUR-Data), HE signal A field (HE-SIG-A), HE short training field (HE-STF), HE long training field (HE-LTF), short training field, channel estimation field (CEF), header, automatic gain control field (AGC), training (TRN), CEFuvv, CEFvuv, first long training field (LTF-1), data short training field (D-STF), signal B field (SIG-B), VHT signal A field (VHT-SIG-A), VHT short training field (VHT-STF), VHT long training field (VHT-STF), VHT signal B field (VHT-SIG-B), HT signal field (HT-SIG), HT short training field (HT-STF), HT long training field (HT-LTF), physical layer convergence protocol (PLCP) service data unit (PSDU), or the like. In one example, the PPDU may include one or more of an HE transmission vector format, an OFDMA modulation format, or an HE PPDU field structure.

The AP 402c may include a receiver that may be configured to search for a downlink signal (e.g., carried on a downlink backhaul frequency channel). The receiver may be configured to search for the downlink signal using a specific channel allocation scheme to avoid interference between the AP 402c and a backhaul device (e.g., a backhaul modem). In one example, the channel allocation scheme may be dynamic frequency selection (DFS).

The signaling aid may be configured to be aligned to an AP raster or may be configured without being aligned to an AP raster. When the signaling aid is configured to be aligned to an AP raster, the signaling aid may include an AP transmission preamble. The AP transmission preamble may include any suitable preamble field (e.g., L-STF, L-LTF, L-SIG, or the like) configured to operate with a suitable transmission vector format (e.g., HE) and modulation (e.g., OFDMA).

The AP 402c may be configured to identify the one or more backhaul frequency channels present in the backhaul transmission using various operations. The processing device may be configured to compute, at the AP 402c, an autocorrelation of the backhaul transmission to determine when a carrier signal is present. The processor may be configured to determine when a single carrier modulated signal (e.g., a quadrature amplitude modulation (QAM) signal) is present. The presence of a carrier signal may be determined by using the autocorrelation of the signal to identify a pulse shape (e.g., a root-raised-cosine pulse). If the AP 402c does not have the carrier frequency, then the AP 402c may compute the autocorrelation of the backhaul transmission in a plurality of different frequencies within the one or more channels present in the backhaul transmission.

The AP 402c may be configured to determine a presence in the backhaul transmission of a modulation (e.g., a selected number of quaternary phase shift keying (QPSK) symbols or a different low-order modulation). The carrier frequency may be determined based on the autocorrelation of the backhaul transmission. The symbol rate may be determined based on the pulse shape of the autocorrelation. The modulation, as determined based on the carrier frequency and the pulse shape, may be used to validate the backhaul transmission to facilitate interference avoidance by the AP 402c. Alternatively, or in addition, the AP 402c may be configured to determine a preamble repetition to validate the backhaul transmission.

The AP 402c may be configured to compute backhaul interference in the one or more backhaul frequency channels by correlating one or more of a backhaul preamble or a backhaul pilot sequence to the backhaul transmission (which may use one or more of information from a database or AP location information). The AP 402c may be configured to detect the backhaul transmission and identify one or more of a backhaul preamble or a backhaul pilot sequence in the backhaul transmission. The backhaul preamble may be a preamble specific to the operation of the backhaul device (e.g., the backhaul modem) without being previously configured to include an AP transmission preamble or other signaling aid. The backhaul pilot sequence may be a pilot sequence specific to the operation of the backhaul device (e.g., the backhaul modem).

When the backhaul device (e.g., the backhaul modem) is using multiple input multiple output (MIMO), cross-polarization interference canceling (XPIC), or the like, then the signal to noise ratio at the transmitter of the backhaul device (e.g., the backhaul modem) may be less than or equal to 0 dB. The AP may be configured to use the signal parameters of the nearby backhaul links received from an AFC server to identify one or more of a backhaul preamble or a backhaul pilot sequence in the backhaul transmission using correlation to avoid interference between the AP and the backhaul device (e.g., the backhaul modem).

The AP 402c may be configured to generate one or more antenna radiation patterns (e.g., 421c, 423c, 425) that may reduce interference with backhaul communications and/or incumbent communications. As shown, the AP 402c may be configured to generate an antenna radiation pattern 421c for communications with a communicatively coupled device (e.g., UE 1 422c) and an antenna radiation pattern 423c for communications with a different communicatively coupled device (e.g., UE 2 424c) that may reduce and/or limit an amount of interference with the backhaul device and/or the incumbent devices (e.g., dish-1 412c, and dish-2 414c).

When the AP 402c has detected a backhaul transmission from a backhaul device (e.g., the backhaul modem) and has computed an angle of arrival between the AP 402c and the backhaul device (e.g., the backhaul modem), the AP 402c may be configured using multiple-input and multiple-output (MIMO) to generate a backhaul avoidance beam to clients (e.g., stations, user equipment, or the like). The AP 402c may be configured to transmit the backhaul avoidance beam in one or more operating directions to facilitate avoidance of the backhaul device (and/or the incumbent devices (e.g., dish-1 412c, and dish-2 414c)).

The backhaul avoidance beam may be any suitable beam configured to avoid the angle of arrival from the backhaul device (and/or the incumbent devices (e.g., dish-1 412c, and dish-2 414c)). The backhaul avoidance beam may include a standard power notch in the one or more operating directions (i.e., the directions that avoid the angle of arrival of the backhaul device and/or the incumbent devices (e.g., dish-1 412c, and dish-2 414c)). The backhaul avoidance beam may include a low power indoor notch toward the angle of arrival between the AP 402b and the backhaul device and/or the incumbent devices (e.g., dish-1 412c, and dish-2 414c). The backhaul avoidance beam may include a null pattern toward the angle of arrival between the AP 402c and the backhaul device and/or the incumbent devices (e.g., dish-1 412c, and dish-2 414c).

For example, the antenna radiation patterns 421c and 423c may include a main lobe that may be arranged to reduce interference with the backhaul device (e.g., as shown by an AP 402c interference signal 447) and/or transmissions 413 and 415 between the incumbent devices (e.g., dish-1 412c, and dish-2 414c) by being directed away from an angle of arrival toward backhaul device and/or the incumbent devices (e.g., dish-1 412c, and dish-2 414c). A transmission may be robust in the direction of the main lobe and may be weak in side lobe directions. Transmission, for example, may be close to zero in the areas between the main lobe and side lobe and between separate side lobes. This may be referred to as an antenna null. In beamforming, various antennas in an array may be given a same signal with phase shifts or delays to form the beam in a desired direction. This electronically steered antenna array may include the main lobe, side lobes, and nulls. A null may be created in the order of the path of the communications of the backhaul device and/or the incumbent devices to have less interference in that path.

For wireless devices that are positioned at an angle that would interfere with the backhaul device and/or incumbent devices (e.g., dish-1 412c, and dish-2 414c), a low power indoor notch may be used to prevent interference in the direction of the communicatively coupled device. For wireless devices that are positioned at an angle that would interfere with the backhaul device and/or incumbent devices (e.g., dish-1 412c, and dish-2 414c) when a low power indoor notch is used, an antenna null may be used. For example, a UE (e.g., UE 426c) in the communication path for a backhaul device and/or an incumbent device (e.g., dish-1 412c, and dish-2 414c) may not receive a beam from the AP 402c to prevent interference.

One or more of the AP 402c location, the backhaul device location, or the incumbent device location may be computed based on the angle of arrival (e.g., an angle of arrival between the AP 402c and a transmission from the one or more backhaul devices, an angle of arrival between the AP 402c and a transmission from the one or more incumbent devices (e.g., dish-1 412c, and dish-2 414c), an angle of arrival between the AP 402c and a different device such as a different AP, one or more user equipments, additional, or the like).

The angle of arrival between the AP 402c and a plurality of devices may be used to compute the location of one or more of the AP 402c, the backhaul device, or the incumbent devices (e.g., dish-1 412c, and dish-2 414c). For example, an angle of arrival between the AP 402c and an incumbent device (e.g., dish 1 412c) and the angle of arrival between the AP 402c and the backhaul device may be combined to determine the location of the AP 402c. To illustrate, when the angle of arrival between the incumbent device (e.g., dish 1 412c) and the AP 402c is 135 degrees (with respect to angles provided by a unit circle having a 0 degree angle for a line moving horizontally from left to right in the top-down view shown in FIG. 4C with increasing degrees provided in a counterclockwise direction) and the angle of arrival between the backhaul device and the AP 402c is 0 degrees, then the intersection of lines drawn in a horizontal plane (as shown by the top-down view of FIG. 4C) based on the angle of arrival may be used to compute a location of the AP 402c. That is, the intersection of lines based on the angle of arrival between the AP 402c and different devices (e.g., dish 1 412c which may include a backhaul device), when superimposed on a horizontal plane provided by a top-down view, may be used to determine the location of the AP 402c.

Modifications, additions, or omissions may be made to the AP 402c without departing from the scope of the present disclosure. For example, the AP 402c may include any number of other components that may not be explicitly illustrated or described.

As illustrated in FIG. 4D, an example system architecture 400d for AP interference reduction using angle of arrival may include an automated frequency coordination (AFC) server 454. The system architecture 400d may include a backhaul device, an AP (e.g., a Wi-Fi® AP) 402d, a network 435 (e.g., the internet, which may be configured to communicate with the AFC server 454), a first incumbent device (e.g., dish-1 412d), and a second incumbent device (e.g., dish-2 412d). The AP 402d may include one or more antennas 401d, 403d, 405d, and 407d. The backhaul device may be configured to communicate with the AFC server 454 via a wired and/or wireless connection 470. The first incumbent device (e.g., dish-1 412d) may be configured to communicate a first transmission 413 to the second incumbent device (e.g., dish-2 414d), and the second incumbent device (e.g., dish-2 414d) may be configured to communicate a second transmission 415 to the first incumbent device (e.g., dish-1 412d). The AP 402d may be configured to radiate a radiation pattern 425 that may be in between the transmission path between the first incumbent device (e.g., dish-1 412d) and a second incumbent device (e.g., dish-2 412d). The backhaul device may receive an interfering signal 447 (e.g., an interfering Wi-Fi® signal) from the AP 402d.

The AP 402d may include a processing device configured to receive, from an AFC server 454, one or more signal parameters for one or more incumbent devices (e.g., dish-1 412d, dish-2 414d), one or more backhaul devices, or the like. The one or more incumbent devices (e.g., dish-1 412d, dish-2 414d), one or more backhaul devices, or the like may be within a communication range of the AP 402d. The AP 402d may be configured to compute an angle of arrival between the AP and the one or more incumbent devices (e.g., dish-1 412d, dish-2 414d), one or more backhaul devices, or the like. The AFC server 454 may be configured to be in communication with a data storage (e.g., an AFC database). The data storage may include backhaul device data for the incumbent devices (e.g., dish-1 412d, dish-2 414d), the backhaul device, or the like.

The incumbent avoidance beam may be any suitable beam configured to avoid the angle of arrival from one or more incumbent devices (e.g., dish-1 412d, dish-2 414d), one or more backhaul devices, or the like. The incumbent avoidance beam may include a standard power notch in the one or more operating directions (i.e., the directions that avoid the angle of arrival of the one or more incumbent devices (e.g., dish-1 412d, dish-2 414d), one or more backhaul devices, or the like). The incumbent avoidance beam may include a low power indoor notch toward the angle of arrival between the AP 402b and the one or more incumbent devices (e.g., dish-1 412d, dish-2 414d), one or more backhaul devices, or the like. The incumbent avoidance beam may include a null pattern toward the angle of arrival between the AP 402c and the one or more incumbent devices (e.g., dish-1 412d, dish-2 414d), one or more backhaul devices, or the like.

The AP 402d may be configured to generate one or more antenna radiation patterns (e.g., 421d, 423d, 425) that may reduce interference with backhaul communications and/or incumbent communications. As shown, the AP 402d may be configured to generate an antenna radiation pattern 421d for communications with a communicatively coupled device (e.g., UE 1 422d) and an antenna radiation pattern 423d for communications with a different communicatively coupled device (e.g., UE 2 424d) that may reduce and/or limit an amount of interference with the backhaul device and/or the incumbent devices (e.g., dish-1 412d, dish-2 414d).

For example, the antenna radiation patterns 421d and 423d may include a main lobe that may be arranged to reduce interference with the backhaul device (e.g., as shown by an AP 402d interference signal 447) and/or transmissions 413 and 415 between the incumbent devices (e.g., dish-1 412d, dish-2 414d) by being directed away from an angle of arrival toward the incumbent devices (e.g., dish-1 412d, dish-2 414d). A transmission may be robust in the direction of the main lobe and may be weak in side lobe directions. Transmission, for example, may be close to zero in the areas between the main lobe and side lobe and between separate side lobes. This may be referred to as an antenna null. In beamforming, various antennas in an array may be given a same signal with phase shifts or delays to form the beam in a desired direction. This electronically steered antenna array may include the main lobe, side lobes, and nulls. A null may be created in the order of the path of the communications of the incumbent devices (e.g., dish-1 412d, dish-2 414d) to have less interference in that path.

For wireless devices that are positioned at an angle that would interfere with the incumbent devices (e.g., dish-1 412d, dish-2 414d), a low power indoor notch may be used to prevent interference in the direction of the communicatively coupled device. For wireless devices that are positioned at an angle that would interfere with the incumbent devices (e.g., dish-1 412d, dish-2 414d) when a low power indoor notch is used, an antenna null may be used. For example, a UE in the communication path for an incumbent device (e.g., dish-1 412d, dish-2 414d) may not receive a beam from the AP 402d to prevent interference.

The AP 402d may be configured in accordance with an interference protection criteria based on the angle of arrival. The AP 402d may be configured to receive one or more interference protection parameters from an AFC server 454. The one or more interference protection parameters may include one or more of propagation models based on an exclusion zone, adjacent frequency channel operations, an exclusion direction, or the like. The AP 456 may be configured to avoid selected angles that may be used to define an exclusion direction. The exclusion direction may be defined based on one or more of the I/N ratio, the ratio of the carrier to interference power (C/I) ratio in which the interference may be the signal from the AP 402d. The carrier may be the signal strength of the received transmissions from the one or more incumbent devices (e.g., dish-1 412d, dish-2 414d), or the like, and the noise may be the background noise level. In one example, the interference protection criterion may be a −6 dB I/N ratio which may be used in determining an exclusion direction (e.g., a direction in which the AP 456 may not transmit in a transmit power class which may be specific for a selected frequency channel).

The AP 402d may be configured to access an AFC server 454 to determine a power notch (e.g., standard power, low power indoor, very low power, or the like) for the incumbent avoidance beam. The power notch for the incumbent avoidance beam may be selected to facilitate a predicted interference of less than a predicted I/N ratio. The predicted I/N ratio may be less than any suitable threshold as set forth by a regulatory authority or a governmental entity (e.g., −6 dB as set forth by the FCC for Wi-Fi® communications in the 6 GHz frequency band).

The AFC server 454 may be configure to receive AP device data from the AP 402d. In one example, the AFC server 454 may be configured to an AP identifier from the AP 402d. The AFC server 454 may be configured to receive any suitable device data for the AP 402d from the AP 456 including one or more of: a request identifier (e.g., RequestID), AP device description data (e.g., a serial number, a certification identifier, a rule set identifier), AP location data (e.g., elliptical location data such as center longitude, center latitude, majorAxis, minorAxis, or orientation; elevation location data such as height, height type, or vertical uncertainty; or indoor deployment data), an inquired frequency range (e.g., a low frequency and a high frequency in a frequency range in the 6 GHz frequency band), inquired channel data, or the like. In one example, the AP device data may include one or more of: a geolocation, a location confidence, an antenna height, an FCC identifier (ID), a serial number, interference data, distortion data, noise power data, environmental data, angle of arrival data (e.g., angle of arrival between the AP and other devices, such as incumbent devices, or the like), or the like.

The AFC server 454 may be configured to receive an interference level between the AP 456 and the one or more incumbent devices (e.g., dish-1 412d, dish-2 414d), or the like from the AP 456. In some examples, the AFC server 454 may be configured to compute an I/N ratio for the one or more incumbent devices (e.g., dish-1 412d, dish-2 414d), or the like. In some examples, the AFC server 454 may be configured to compute one or more operating directions for an AP 402d. The one or more operating directions may have an I/N ratio of less than a threshold at the one or more incumbent devices (e.g., dish-1 412d, dish-2 414d), or the like.

The AP 456 may be configured to determine an angle between the AP 456 and the one or more incumbent devices (e.g., dish-1 412d, dish-2 414d), or the like based on the angle of arrival of a transmission received from the one or more incumbent devices (e.g., dish-1 412d, dish-2 414d), or the like. Determining an angle between the AP 456 and the one or more incumbent devices (e.g., dish-1 412d, dish-2 414d) may include determining a location of the AP 456. In some implementations, the AP 402d may be configured to determine and/or transmit the location of the one or more incumbent devices (e.g., dish-1 412d, dish-2 414d), or the like to the AFC server 454 via a network 435 such as the Internet.

The AP 402d may share its location to receive permission from the AFC server 454 to perform various operations, including to use standard power Wi-Fi® transmission in the 6 GHz frequency band. To determine the location of the AP 402d, a geolocation may be determined, such as by using a global positioning service (GPS) location of the AP 402d. The AP 456 may be configured to send, from the AP 402d for transmission to an AFC server 454, the AP location and receive, at the AP 402d from the AFC server 454, a transmission power mode permission (e.g., to operate in a transmit power class). The AP 402d may be configured to determine a transmission power mode based on a power setting permission. The transmission power mode may be one or more of: (i) a non-transmitting power mode, (ii) a very low power mode, (iii) a low power mode, or (iv) a standard power mode. The AP 456 may include a transceiver that may be configured to receive additional operating directions from an AFC server 454. The transceiver may be configured to receive the location of the one or more incumbent devices (e.g., dish-1 412d, dish-2 414d), or one or more APs 402d from the AFC server 454.

Figure 5A:
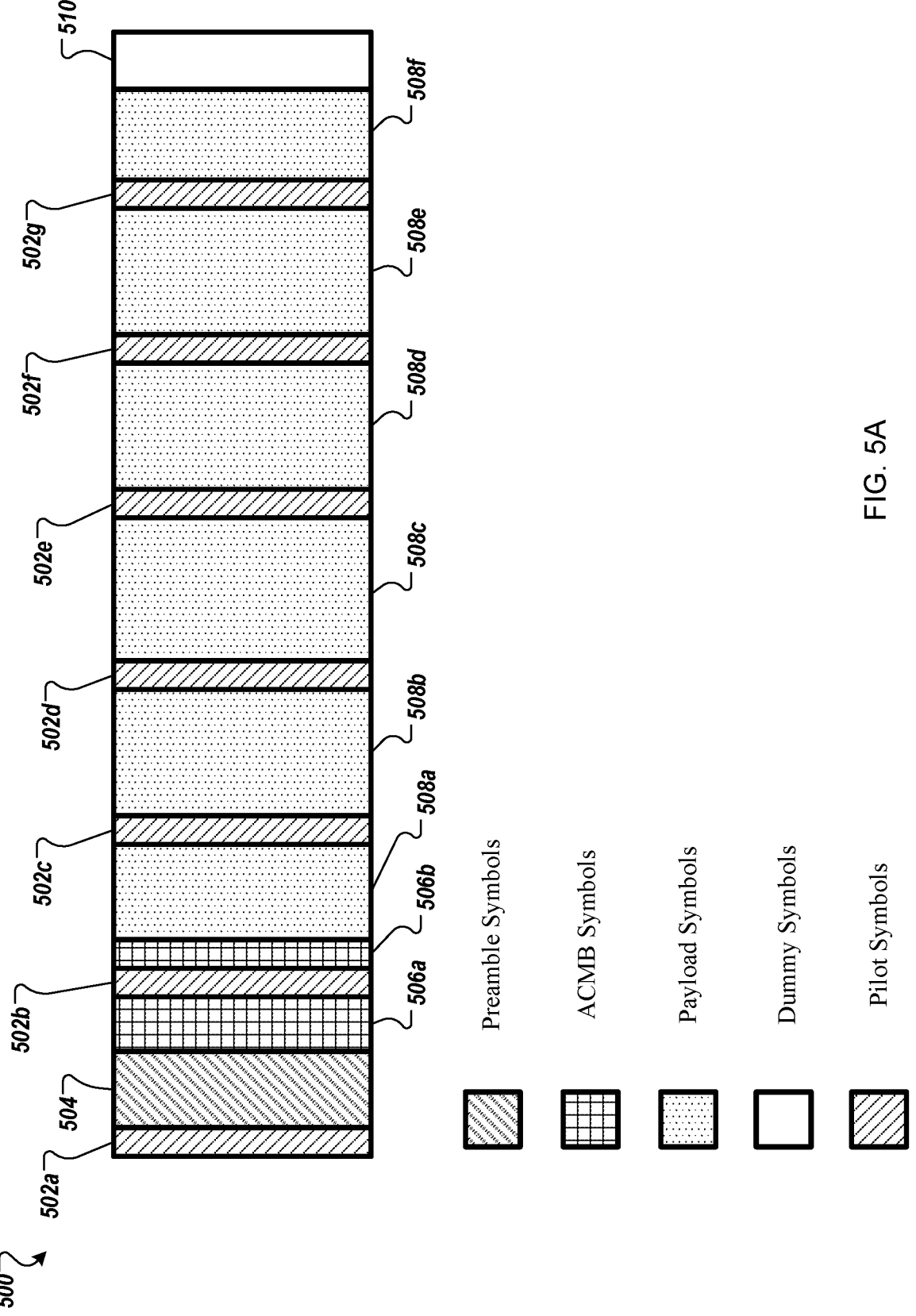
FIG. 5A illustrates an example of a backhaul frame of a backhaul device.

FIG. 5A illustrates a block diagram of an example frame structure 500 for a backhaul transmission which may be detected at an AP. The AP may detect the backhaul transmission, or another device may detect the backhaul transmission. To detect the backhaul transmission at the AP, pilot symbols or preamble symbols may be inserted into the frame structure. As illustrated, pilot symbols 502a, 502b, 502c, 502d, 502e, 502f, 502g may be inserted into the example frame structure 500 for detection at an AP. The pilot symbols 502a, 502b, 502c, 502d, 502e, 502f, 502g may be inserted periodically (e.g., periodically in 20 to 40 data symbols). Alternatively, or in addition, preamble symbols 504 may be inserted. The frame structure may include various other fields including adaptive code modulation and baud rate (ACMB) symbols 506a, 506b, payload symbols 508a, 508b, 508c, 508d, 508e, 508f, dummy symbols 510, or the like.

Figure 5B:
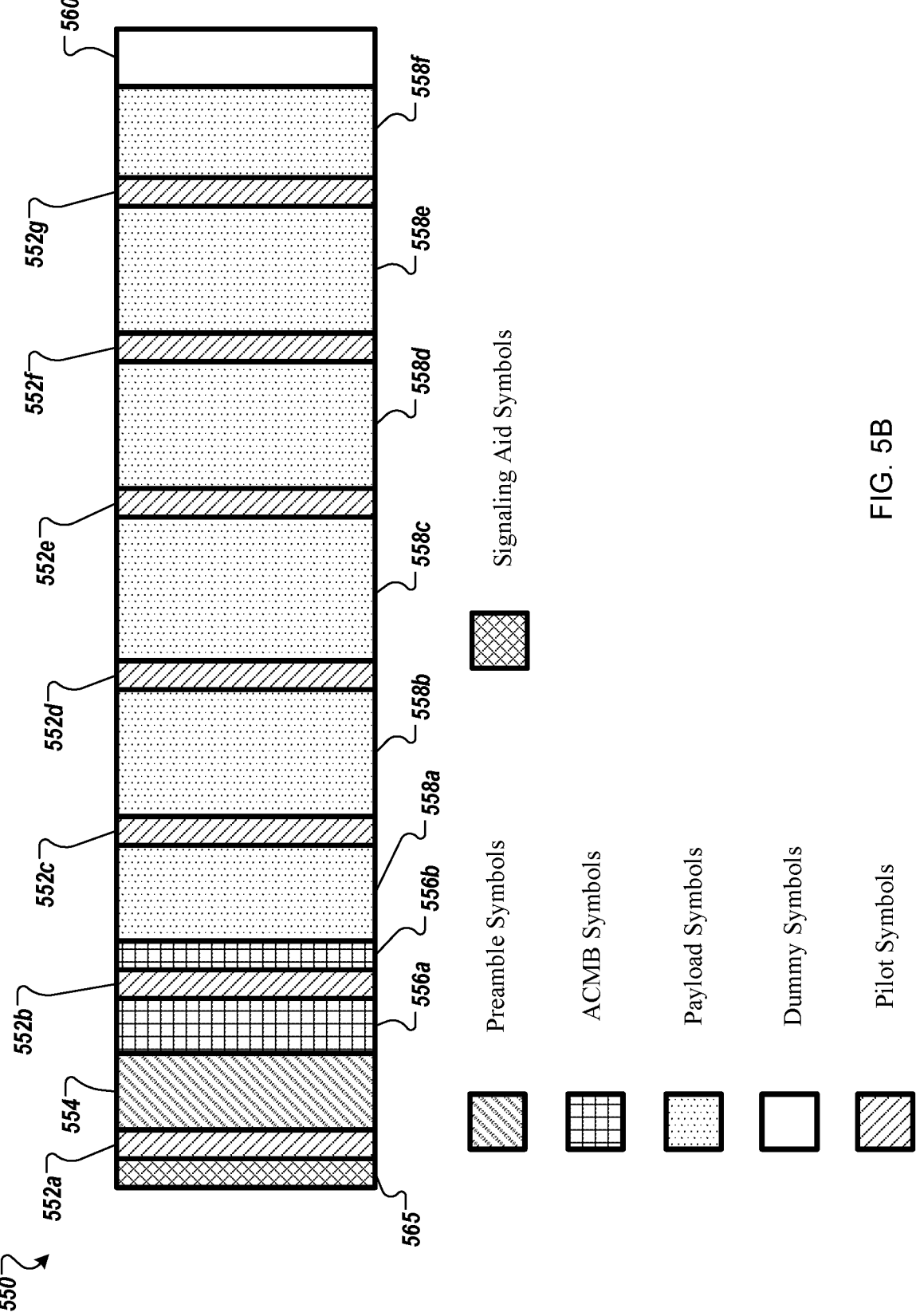
FIG. 5B illustrates an example of a signaling aid in combination with a backhaul frame of a backhaul device.

FIG. 5B illustrates a block diagram of an example backhaul frame structure 550 for a backhaul transmission which includes a signaling aid that may be detected at an AP. The backhaul frame structure 550 may include pilot symbols 552a, 552b, 552c, 552d, 552e, 552f, 552g, preamble symbols 554, ACMB symbols 556a, 556b, 558a, 558b, 558c, 558d, 558e, 558f, and dummy symbols 560. The signaling aid may include signaling aid symbols 565 that may be added to the backhaul frame structure. The signaling aid symbols 565 are added to the backhaul frame structure to facilitate detection by an AP (e.g., a Wi-Fi® AP).

The signaling aid symbols 565 may be configured for detection at a Wi-Fi® AP. The signaling aid symbols may be modulated using OFDM and may have a carrier spacing that is the same as the carrier spacing of one or more of WiFi® L-STF or WiFi® L-LTF. The modulated sequence may be generated to identify the transmitting device as a backhaul device (e.g., a backhaul modem) instead of a Wi-Fi® AP. In one example, the signaling aid symbols 565 may include a Wi-Fi® AP preamble to be detected at an AP (e.g., a Wi-Fi® AP).

Figure 6:
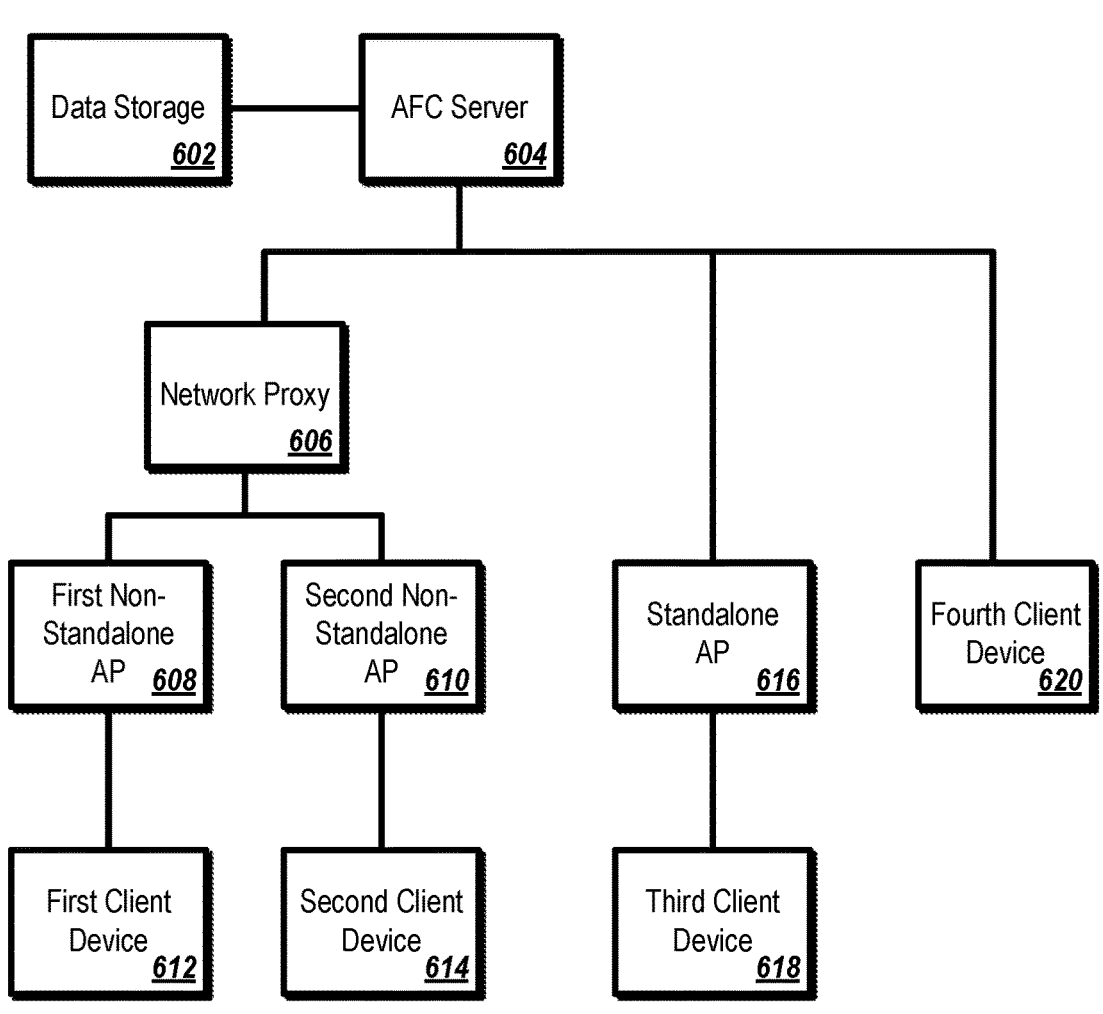
FIG. 6 illustrates a block diagram of an example automated frequency coordination (AFC) system.

FIG. 6 illustrates a block diagram of an example automated frequency coordination (AFC) architecture 600, in accordance with at least one example described in the present disclosure. The AFC architecture 600 may include a data storage 602, an AFC server 604, a network proxy 606, a first non-standalone AP 608, a second non-standalone AP 610, a standalone AP 616, referred to collectively as the APs, a first client device 612, a second client device 614, a third client device 618, and a fourth client device 620. The AFC server 604 may be a system that determines and provides lists of frequencies that are available for use by access points operating in the 6 GHz frequency band. The network proxy 606 may be a first example of a device configured to access the AFC server 604, the standalone AP 616 may be a second example of a device configured to access the AFC server 604, and the fourth client device 620 may be a third example of a device configured to access the AFC server 604.

The data storage 602 may be an AFC database (i.e., a database configured to interface with the AFC server 604). The AFC database may include one or more of a universal licensing system (ULS) database or an equipment authorization system (EAS) database. The AFC database may include incumbent data. In one example, the incumbent data may include a list of incumbent systems or incumbent devices that may be configured to transmit using 6 GHz communications. For example, the ULS database may include a collection of licenses issued for communications using 6 GHz communications, such as a list of microwave links configured to transmit using a frequency between 5925 MHz and 7125 MHz (e.g., UNII-5 frequency band through UNII-8 frequency band). Incumbents may include e.g., fixed service, satellite service, TV, and other broadcast services. In some examples, the data storage may be managed by a regulatory agency, such as the FCC.

The AFC database may include incumbent device data for one or more incumbent devices. The incumbent device data may include one or more of: a request identifier (e.g., RequestID), incumbent device description data (e.g., a serial number, a certification identifier, a rule set identifier), location data (e.g., elliptical location data such as center longitude, center latitude, majorAxis, minorAxis, or orientation; elevation location data such as height, height type, or vertical uncertainty; or indoor deployment data), an inquired frequency range (e.g., a low frequency and a high frequency in a frequency range in the 6 GHz frequency band), inquired channel data, or the like. In one example, the incumbent device data may include one or more of: a geolocation, a location confidence, an antenna height, an FCC identifier (ID), a serial number, interference data, distortion data, noise power data, environmental data, angle of arrival data (e.g., angle of arrival between the AP and other devices, such as incumbent devices which may include backhaul devices, or the like), or the like.

The AFC server 604 may be configured to obtain at least a portion of data from the data storage 602. For example, the AFC server 604 may be configured to obtain one or more microwave links, such as from one or more of an incumbent system or an incumbent device. The microwave links may be obtained from within a geographic area (e.g., within a selected range).

Alternatively or in addition, the AFC server 604 may be configured to receive operating characteristics from a device such as e.g., an access point (a first non-standalone AP 608 or a second non-standalone AP 610 via a network proxy 606, a standalone AP 616) or a client device (e.g., a first client device 612 or second client device 614 via the first non-standalone AP 608 or the second non-standalone AP 610, respectively, via the network proxy 606; or a third client device 618 via the standalone AP 616; or a fourth client device 620). Alternatively, or additionally, the AFC server 604 may be configured to receive operational characteristics from one or more receivers in the networks, such as a microwave receiver or a backhaul receiver.

The operational characteristics may include any suitable characteristics used in one or more of allocating bandwidth to a device or avoiding interference between incumbent systems/devices and another device that may be stored in the data storage 602. The operational characteristics may include one or more of: a request identifier (e.g., RequestID), incumbent device description data (e.g., a serial number, a certification identifier, a rule set identifier), location data (e.g., elliptical location data such as center longitude, center latitude, majorAxis, minorAxis, or orientation; elevation location data such as height, height type, or vertical uncertainty; or indoor deployment data), an inquired frequency range (e.g., a low frequency and a high frequency in a frequency range in the 6 GHz frequency band), inquired channel data, a geolocation, a location confidence, an antenna height, an FCC identifier (ID), a serial number, interference data, distortion data, noise power data, environmental data, angle of arrival data (e.g., angle of arrival between the AP and other devices, such as incumbent devices which may include backhaul devices, or the like), or the like.

The AFC server 604 may be configured to determine one or more of estimates or measurements of one or more of distortion, interference, noise power, or the like for any suitable component in the architecture 600 such as APs (e.g., first non-standalone AP 608, second non-standalone AP 610, standalone AP 616, or the like) or any other suitable component such as radios, microwave systems, microwave modems, microwave receivers, or the like.

The AFC server 604 may be configured to provide one or more operating frequencies to a device (e.g., a Wi-Fi® AP) to avoid an interference condition. In one example, the operating frequencies may not cause an I/N ratio of greater than a threshold (e.g., −6 dB in accordance with an FCC regulation). For example, the AFC server 604 may determine that a first frequency in the 6 GHz frequency band may cause an I/N ratio of less than a threshold (e.g., less than −6 dB) at an incumbent system, and the AFC server 604 may provide the first frequency in the 6 GHz frequency band to the device (e.g., a Wi-Fi® AP) to be used as an operating frequency.

The AFC server 604 may be configured to provide one or more operating directions and/or operating frequencies to a device (e.g., a Wi-Fi® AP) to avoid a time-based interference condition. In one example, the time-based interference condition may prohibit an I/N ratio that exceeds a threshold (e.g., 19 dB) for more than a selected percentage of time (e.g., for more than $4.5 \times 10^{-4}$%) in a selected time period (e.g., a day, a week, a month, or the like). In another example, the time-based interference condition may prohibit an I/N ratio that exceeds a threshold (e.g., −10 dB, −20 dB, or the like), for a selected percentage of time (e.g., 20%) in a selected time period (e.g., a day, a week, a month, or the like).

The AFC server 604 may be configured to compute or estimate an interference to noise (I/N) ratio for the incumbent device based on the mean square error (MSE) value for the incumbent device. The actual I/N impact at a microwave receiver may not be available to the AFC server 604. The AFC server 604, a governmental entity, or a regulatory entity (e.g., the FCC) may rely on offline feedback, such as MSE values, to determine compliance with the I/N ratio. In addition to determining compliance with the regulation (e.g., the FCC regulation to avoid an I/N ratio of greater than-6 dB), the techniques described herein may be used to provide historical data for debugging (e.g., debug views like spectrum waterfall) and maintenance.

Modifications, additions, or omissions may be made to the AFC server 604 without departing from the scope of the present disclosure. For example, in some examples, the AFC server 604 may include any number of other components that may not be explicitly illustrated or described.

Figure 7:
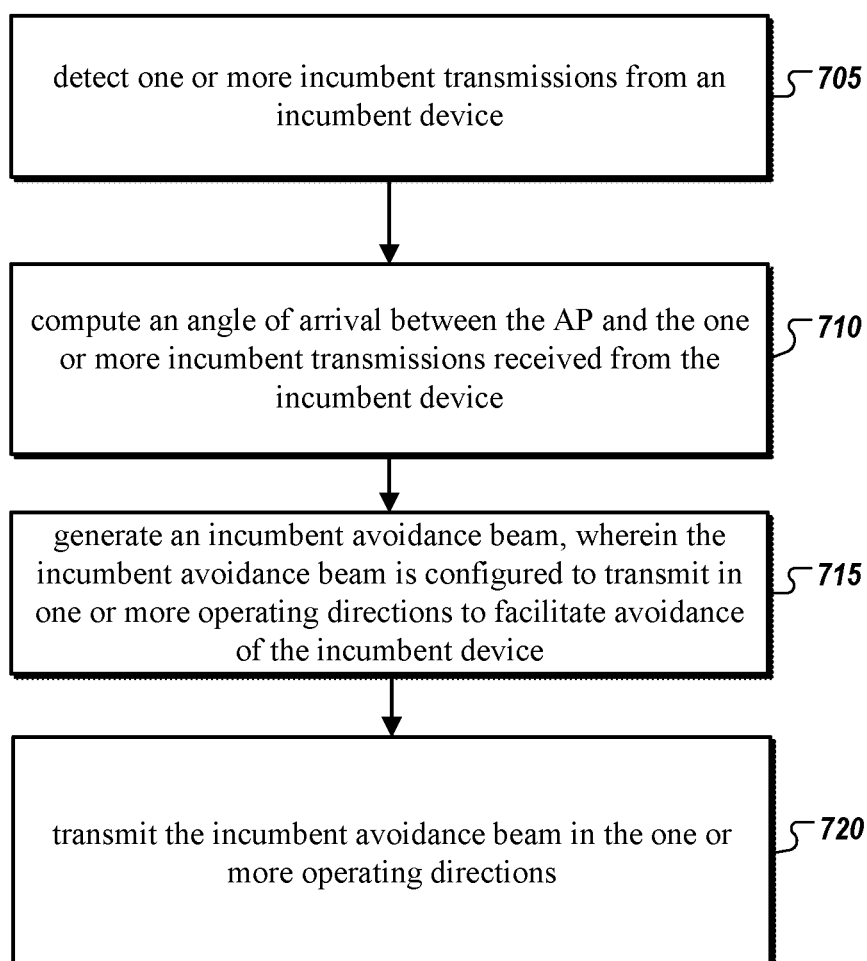
FIG. 7 illustrates an example process flow of an access point configured to generate an incumbent avoidance beam.

FIG. 7 illustrates a process flow of an example method 700 of AP interference reduction using angle of arrival, in accordance with at least one example described in the present disclosure. The method 700 may be arranged in accordance with at least one example described in the present disclosure.

The method 700 may be performed by processing logic that may include hardware (circuitry, dedicated logic, etc.), software (such as is run on a computer system or a dedicated machine), or a combination of both, which processing logic may be included in the processing device (e.g., processor)

Figure 10:
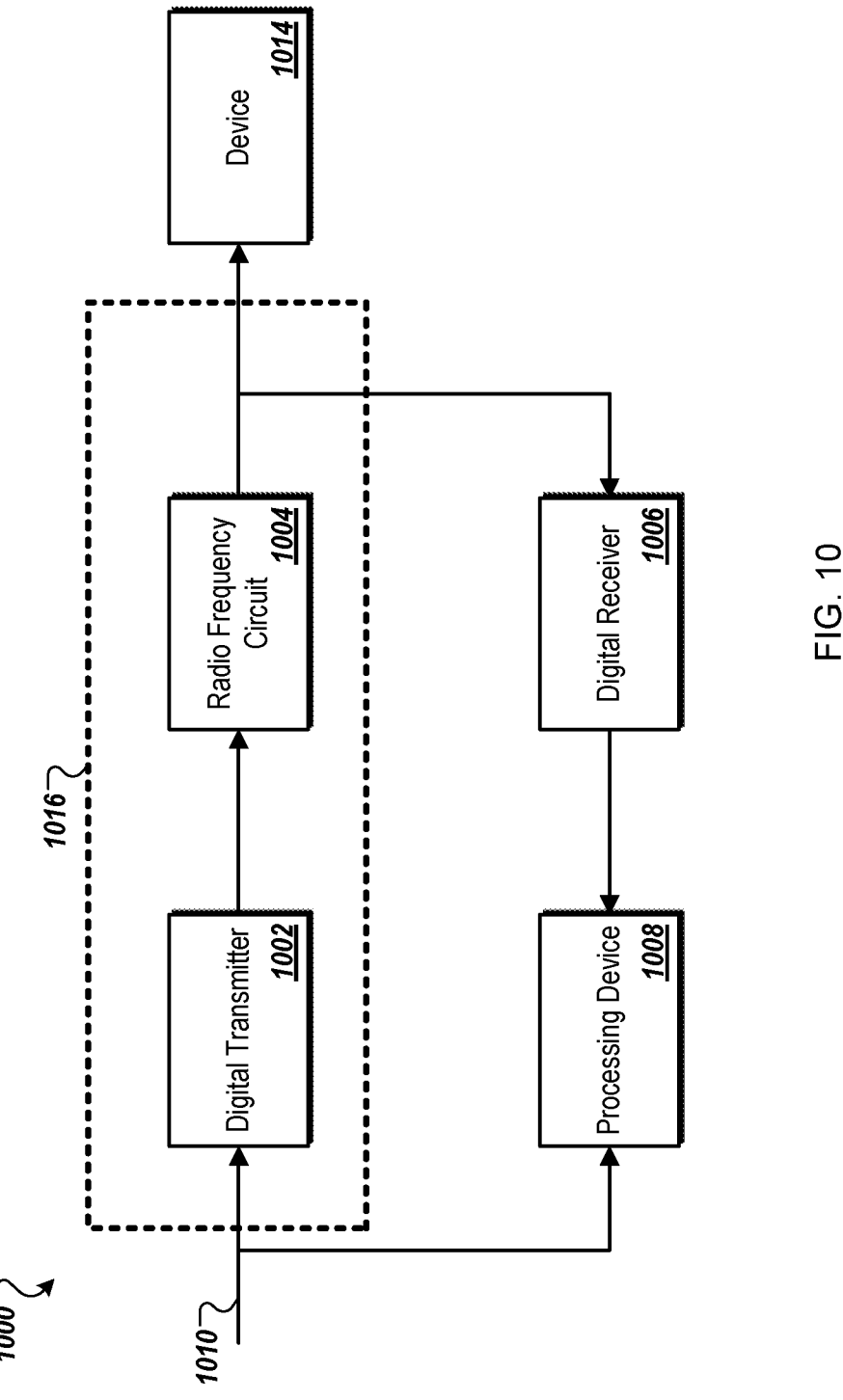
FIG. 10 illustrates an example communication system configured for access point interference reduction.
Figure 11:
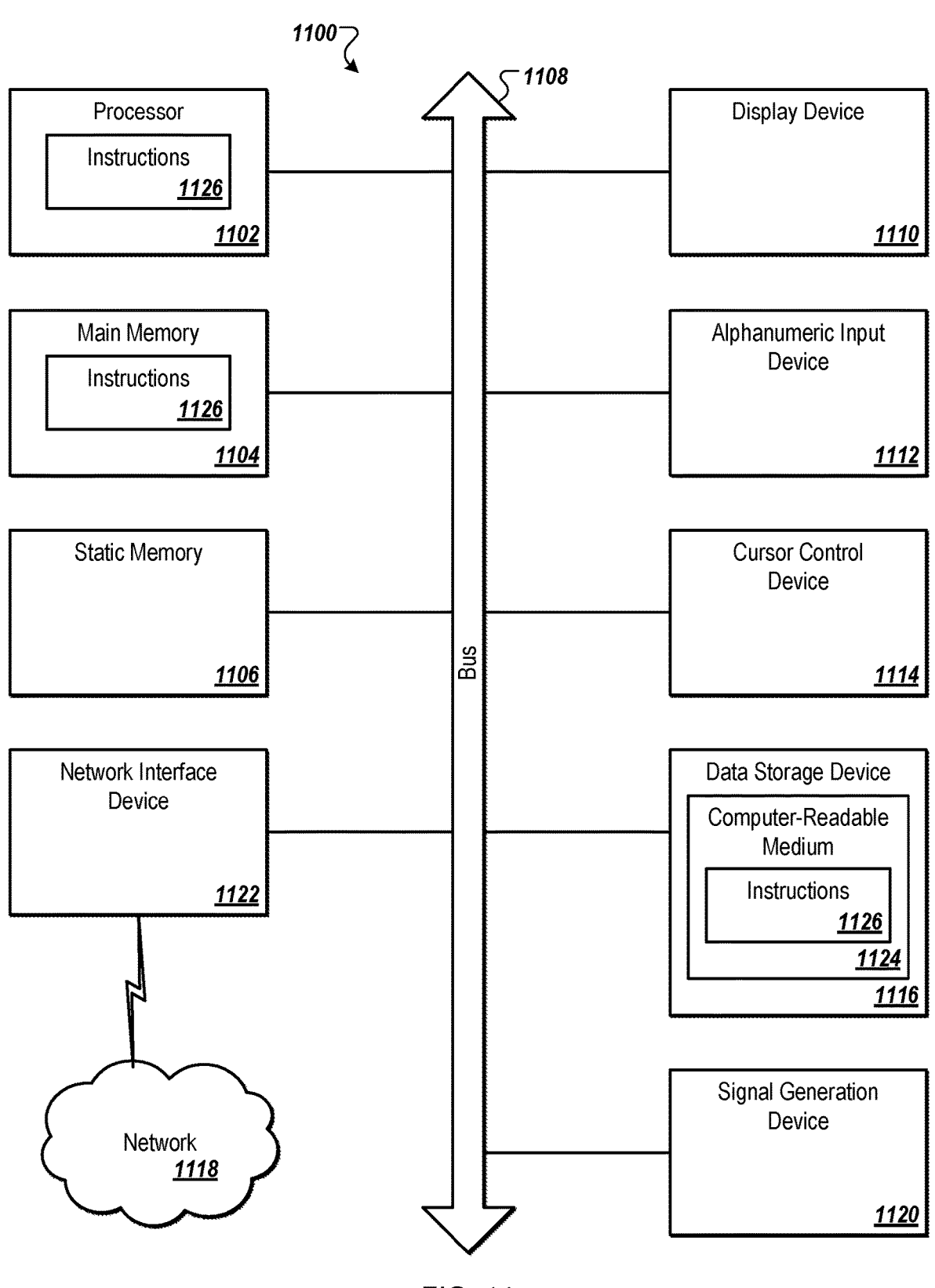
FIG. 11 illustrates a diagrammatic representation of a machine in the example form of a computing device within which a set of instructions, for causing the machine to perform any one or more of the methods discussed herein, may be executed.

1102 of FIG. 11, the communication system 1000 of FIG. 10, or another device, combination of devices, or systems.

The method 700 may begin at block 705 where the processing logic may detect one or more incumbent transmissions from an incumbent device.

At block 710, the processing logic may compute an angle of arrival between the AP and the one or more incumbent transmissions received from the incumbent device.

At block 715, the processing logic may generate an incumbent avoidance beam, wherein the incumbent avoidance beam is configured to transmit in one or more operating directions to facilitate avoidance of the incumbent device.

At block 720, the processing logic may transmit the incumbent avoidance beam in the one or more operating directions.

Modifications, additions, or omissions may be made to the method 700 without departing from the scope of the present disclosure. For example, in some examples, the method 700 may include any number of other components that may not be explicitly illustrated or described.

FIG. 8 illustrates a process flow of an example method 800 that may be used for AP interference reduction using angle of arrival, in accordance with at least one example described in the present disclosure. The method 800 may be arranged in accordance with at least one example described in the present disclosure.

The method 800 may be performed by processing logic that may include hardware (circuitry, dedicated logic, etc.), software (such as is run on a computer system or a dedicated machine), or a combination of both, which processing logic may be included in the processing device (e.g., processor) 1102 of FIG. 11, the communication system 1000 of FIG. 10, or another device, combination of devices, or systems.

The method 800 may begin at block 805 where the processing logic may receive, at the AP from an automatic frequency coordination (AFC) server, one or more incumbent signal parameters for an incumbent device.

At block 810, the processing logic may compute an angle of arrival between the AP and an incumbent transmission received from the incumbent device based on the one or more incumbent signal parameters.

At block 815, the processing logic may generate an incumbent avoidance beam, wherein the incumbent avoidance beam is configured to transmit in one or more operating directions to avoid the incumbent device At block 820, the processing logic may transmit the incumbent avoidance beam in the one or more operating directions.

Modifications, additions, or omissions may be made to the method 800 without departing from the scope of the present disclosure. For example, in some examples, the method 800 may include any number of other components that may not be explicitly illustrated or described.

Figure 9:
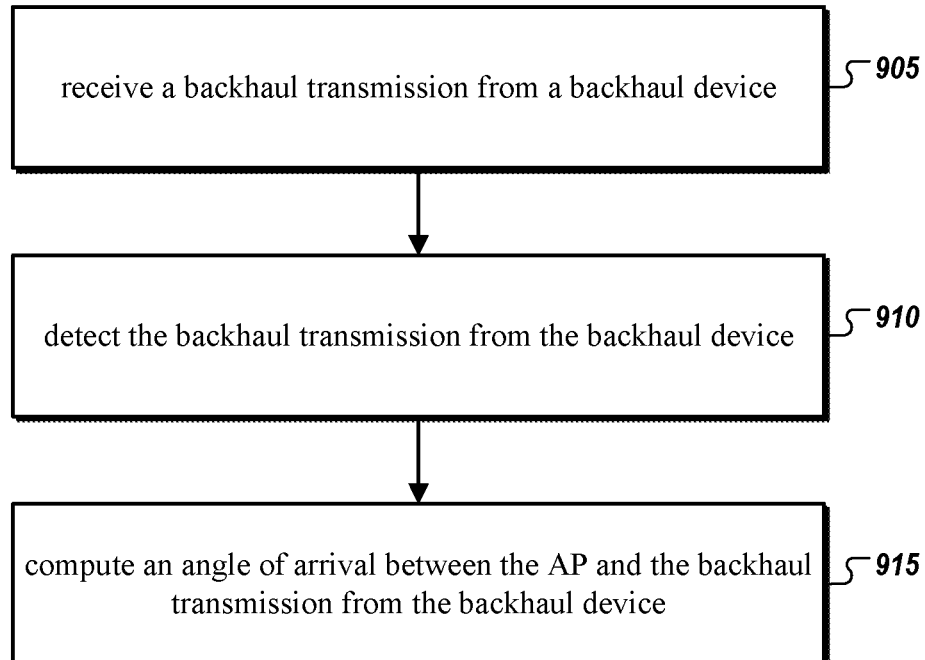
FIG. 9 illustrates an example process flow of an access point (AP) device configured to generate an incumbent avoidance beam.

FIG. 9 illustrates a process flow of an example method 900 that may be used for AP interference reduction using angle of arrival, in accordance with at least one example described in the present disclosure. The method 900 may be arranged in accordance with at least one example described in the present disclosure.

The method 900 may be performed by processing logic that may include hardware (circuitry, dedicated logic, etc.), software (such as is run on a computer system or a dedicated machine), or a combination of both, which processing logic may be included in the processing device (e.g., processor) 1102 of FIG. 11, the communication system 1000 of FIG. 10, or another device, combination of devices, or systems.

The method 900 may begin at block 905 where the processing logic receives the backhaul transmission from the backhaul device.

At block 910, the processing logic may detect the backhaul transmission from the backhaul device.

At block 915, the processing logic may compute an angle of arrival between the AP and the backhaul transmission from the backhaul device.

Modifications, additions, or omissions may be made to the method 900 without departing from the scope of the present disclosure. For example, in some examples, the method 900 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 10 illustrates a block diagram of an example communication system 1000 configured for AP interference reduction, in accordance with at least one example described in the present disclosure. The communication system 1000 may include a digital transmitter 1002, a radio frequency circuit 1004, a device 1014, a digital receiver 1006, and a processing device 1008. The digital transmitter 1002 and the processing device may be configured to receive a baseband signal via connection 1010. A transceiver 1016 may include the digital transmitter 1002 and the radio frequency circuit 1004.

In some examples, the communication system 1000 may include a system of devices that may be configured to communicate with one another via a wired or wireline connection. For example, a wired connection in the communication system 1000 may include one or more Ethernet cables, one or more fiber-optic cables, and/or other similar wired communication mediums. Alternatively, or additionally, the communication system 1000 may include a system of devices that may be configured to communicate via one or more wireless connections. For example, the communication system 1000 may include one or more devices configured to transmit and/or receive radio waves, microwaves, ultrasonic waves, optical waves, electromagnetic induction, and/or similar wireless communications. Alternatively, or additionally, the communication system 1000 may include combinations of wireless and/or wired connections. In these and other examples, the communication system 1000 may include one or more devices that may be configured to obtain a baseband signal, perform one or more operations to the baseband signal to generate a modified baseband signal, and transmit the modified baseband signal, such as to one or more loads.

In some examples, the communication system 1000 may include one or more communication channels that may communicatively couple systems and/or devices included in the communication system 1000. For example, the transceiver 1016 may be communicatively coupled to the device 1014.

In some examples, the transceiver 1016 may be configured to obtain a baseband signal. For example, as described herein, the transceiver 1016 may be configured to generate a baseband signal and/or receive a baseband signal from another device. In some examples, the transceiver 1016 may be configured to transmit the baseband signal. For example, upon obtaining the baseband signal, the transceiver 1016 may be configured to transmit the baseband signal to a separate device, such as the device 1014. Alternatively, or additionally, the transceiver 1016 may be configured to modify, condition, and/or transform the baseband signal in advance of transmitting the baseband signal. For example, the transceiver 1016 may include a quadrature up-converter and/or a digital to analog converter (DAC) that may be configured to modify the baseband signal. Alternatively, or additionally, the transceiver 1016 may include a direct RF sampling converter that may be configured to modify the baseband signal.

In some examples, the digital transmitter 1002 may be configured to obtain a baseband signal via connection 1010. In some examples, the digital transmitter 1002 may be configured to up-convert the baseband signal. For example, the digital transmitter 1002 may include a quadrature up-converter to apply to the baseband signal. In some examples, the digital transmitter 1002 may include an integrated digital to analog converter (DAC). The DAC may convert the baseband signal to an analog signal, or a continuous time signal. In some examples, the DAC architecture may include a direct RF sampling DAC. In some examples, the DAC may be a separate element from the digital transmitter 1002.

In some examples, the transceiver 1016 may include one or more subcomponents that may be used in preparing the baseband signal and/or transmitting the baseband signal. For example, the transceiver 1016 may include an RF front end (e.g., in a wireless environment) which may include a power amplifier (PA), a digital transmitter (e.g., 1002), a digital front end, an institute of electrical and electronics engineers (IEEE) 1588v2 device, a Long-Term Evolution (LTE) physical layer (L-PHY), an (S-plane) device, a management plane (M-plane) device, an Ethernet media access control (MAC)/ personal communications service (PCS), a resource controller/scheduler, and the like. In some examples, a radio (e.g., a radio frequency circuit 1004) of the transceiver 1016 may be synchronized with the resource controller via the S-plane device, which may contribute to high-accuracy timing with respect to a reference clock.

In some examples, the transceiver 1016 may be configured to obtain the baseband signal for transmission. For example, the transceiver 1016 may receive the baseband signal from a separate device, such as a signal generator. For example, the baseband signal may come from a transducer configured to convert a variable into an electrical signal, such as an audio signal output of a microphone picking up a speaker's voice. Alternatively, or additionally, the transceiver 1016 may be configured to generate a baseband signal for transmission. In these and other examples, the transceiver 1016 may be configured to transmit the baseband signal to another device, such as the device 1014.

In some examples, the device 1014 may be configured to receive a transmission from the transceiver 1016. For example, the transceiver 1016 may be configured to transmit a baseband signal to the device 1014.

In some examples, the radio frequency circuit 1004 may be configured to transmit the digital signal received from the digital transmitter 1002. In some examples, the radio frequency circuit 1004 may be configured to transmit the digital signal to the device 1014 and/or the digital receiver 1006. In some examples, the digital receiver 1006 may be configured to receive a digital signal from the RF circuit and/or send a digital signal to the processing device 1008.

In some examples, the processing device 1008 may be a standalone device or system, as illustrated. Alternatively, or additionally, the processing device 1008 may be a component of another device and/or system. For example, in some examples, the processing device 1008 may be included in the transceiver 1016. In instances in which the processing device 1008 is a standalone device or system, the processing device 1008 may be configured to communicate with additional devices and/or systems remote from the processing device 1008, such as the transceiver 1016 and/or the device 1014. For example, the processing device 1008 may be configured to send and/or receive transmissions from the transceiver 1016 and/or the device 1014. In some examples, the processing device 1008 may be combined with other elements of the communication system 1000.

FIG. 11 illustrates a diagrammatic representation of a machine in the example form of a computing device 1100 within which a set of instructions, for causing the machine to perform any one or more of the methods discussed herein, may be executed. The computing system may be configured to implement or direct one or more operations associated with AP interference reduction. The computing device 1100 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative examples, the machine may be connected (e.g., networked) to other machines in a local area network (LAN), an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 1100 includes a processing device (e.g., a processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)) and a data storage device 1116, which communicate via a bus 1108.

Processing device 1102 represents one or more general-purpose processing devices such as a microprocessor, central processing unit, or the like. More particularly, the processing device 1102 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also include one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computing device 1100 may further include a network interface device 1122 which may communicate with a network 1118. The computing device 1100 also may include a display device 1110 (e.g., a liquid crystal display (LCD) or a cathode ray tube (CRT)), an alphanumeric input device 1112 (e.g., a keyboard), a cursor control device 1114 (e.g., a mouse) and a signal generation device 1120 (e.g., a speaker). In at least one example, the display device 1110, the alphanumeric input device 1112, and the cursor control device 1114 may be combined into a single component or device (e.g., an LCD touch screen).

The data storage device 1116 may include a computer-readable storage medium 1124 on which is stored one or more sets of instructions 1126 embodying any one or more of the methods or functions described herein. The instructions 1126 may also reside, completely or at least partially, within the main memory 1104 and/or within the processing device 1102 during execution thereof by the computing device 1100, the main memory 1104 and the processing device 1102 also constituting computer-readable media. The instructions may further be transmitted or received over a network 1118 via the network interface device 1122.

While the computer-readable storage medium 1124 is shown in an example to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

In some examples, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An access point (AP), comprising:
a processing device configured to:
detect one or more incumbent transmissions from an incumbent device;
estimate an angle of arrival at the AP of the one or more incumbent transmissions received from the incumbent device; and
generate an incumbent avoidance transmission radiation pattern in which radiated power is reduced toward the estimated angle of arrival to reduce interference at a receiver associated with the incumbent device; and
a transceiver configured to:

27 transmit a wireless signal according to the transmission radiation pattern in one or more transmission directions.

2. The access point of claim 1, wherein the transmission radiation pattern includes a low power indoor (LPI) notch toward the estimated angle of arrival at the AP and the one or more incumbent transmissions received from the incumbent device, the LPI notch having a power spectral density (PSD) of at most 5 dBm/MHz and an effective isotropic radiated power (EIRP) of at most 30 dBm for a 320-MHz channel, scaled per channel bandwidth.

3. The access point of claim 1, wherein the transmission radiation pattern includes a standard power notch in the one or more transmission directions, the standard power notch having an effective isotropic radiated power (EIRP) of at most 36 dBm.

4. The access point of claim 1, wherein the transmission radiation pattern includes an antenna null toward the angle of arrival at the AP and the one or more incumbent transmissions received from the incumbent device.

5. The access point of claim 1, wherein the incumbent transmission is detected using:
   a correlation, determined by the processing device, the correlation being between the one or more incumbent transmissions and one or more of an incumbent preamble or an incumbent pilot of the one or more incumbent transmissions.

6. The access point of claim 1, wherein the processing device is further configured to:
   receive, at the AP from an automatic frequency coordination (AFC) server, one or more incumbent signal parameters for the incumbent device within a communication range of the AP.

7. The access point of claim 6, wherein the one or more incumbent signal parameters include one or more of: a geolocation, a location confidence, an antenna height, a federal communications commission (FCC) identifier (ID), a serial number, interference data, distortion data, noise power data, environmental data, or angle of arrival data.

8. The access point of claim 1, wherein the processing device is further configured to:
   receive, at the AP from an automatic frequency coordination (AFC) server, one or more of an AP location or an incumbent location.

9. An access point (AP), comprising:
   a processing device configured to:
      receive, at the AP from an automatic frequency coordination (AFC) server, one or more incumbent signal parameters for an incumbent device;
      estimate an angle of arrival at the AP of an incumbent transmission received from the incumbent device based on the one or more incumbent signal parameters; and
      generate an incumbent avoidance transmission radiation pattern in which radiated power is reduced toward the estimated angle of arrival to reduce interference at a receiver associated with the incumbent device; and
   a transceiver configured to:
      transmit a wireless signal according to the transmission radiation pattern in one or more transmission directions.

10. The access point of claim 9, wherein the one or more incumbent signal parameters include one or more of: a geolocation, a location confidence, an antenna height, an federal communications commission (FCC) identifier (ID), a serial number, interference data, distortion data, noise power data, environmental data, or angle of arrival data.

11. The access point of claim 9, wherein the transmission radiation pattern includes a low power indoor (LPI) notch toward the estimated angle of arrival at the AP of the incumbent transmission received from the incumbent device, the LPI notch having a PSD of at most 5 dBm/MHz and an effective isotropic radiated power (EIRP) of at most 30 dBm for a 320-MHz channel, scaled per channel bandwidth.

12. The access point of claim 9, wherein the transmission radiation pattern includes a standard power notch in the one or more transmission directions, the standard power notch having an effective isotropic radiated power (EIRP) of at most 36 dBm.

13. The access point of claim 9, wherein the transmission radiation pattern includes an antenna null toward the estimated angle of arrival at the AP of the incumbent transmission received from the incumbent device.

14. The access point of claim 9, wherein the processing device is further configured to:
   receive, at the AP from the AFC server, one or more of an AP location or an incumbent location.

15. An access point (AP), comprising:
   a transceiver configured to receive a backhaul transmission from a backhaul device; and
   a processing device configured to:
      detect the backhaul transmission from the backhaul device; and
      estimate an angle of arrival at the AP of the backhaul transmission from the backhaul device, and
      wherein the backhaul transmission is detected using one or more of:
         an AP preamble in the backhaul transmission, or
         a correlation, determined by the processing device, between the backhaul transmission and one or more of a backhaul preamble or a backhaul pilot.

16. The access point of claim 15, wherein the processing device is further configured to:
   generate a backhaul avoidance transmission radiation pattern in which radiated power is reduced toward the estimated angle of arrival at the AP of the backhaul transmission, and to configure the transceiver to transmit according to the transmission radiation pattern in one or more transmission directions.

17. The access point of claim 16, wherein the transmission radiation pattern includes a low power indoor (LPI) notch oriented toward the estimated angle of arrival between the AP and the backhaul transmission of the backhaul device, the LPI notch having a PSD of at most 5 dBm/MHz and an effective isotropic radiated power (EIRP) of at most 30 dBm for a 320-MHz channel, scaled per channel bandwidth.

18. The access point of claim 16, wherein the transmission radiation pattern includes a standard power notch in the one or more transmission directions, the standard power notch having an effective isotropic radiated power (EIRP) of at most 36 dBm.

19. The access point of claim 16, wherein the transmission radiation pattern includes an antenna null toward the estimated angle of arrival at the AP of the backhaul transmission of the backhaul device.

20. The access point of claim 16, wherein the processing device is further configured to:
   compute one or more of an AP location or a backhaul location based on the angle of arrival.

* * * * *